United States Patent [19]

Vassiliadis et al.

[11] Patent Number: 4,924,422
[45] Date of Patent: May 8, 1990

[54] METHOD AND APPARATUS FOR MODIFIED CARRY-SAVE DETERMINATION OF ARITHMETIC/LOGIC ZERO RESULTS

[75] Inventors: Stamatis Vassiliadis, Vestal; Michael Putrino, Endicott; Ann E. Huffman, Johnson City, all of N.Y.

[73] Assignee: International Business Machines Corporation, Armonk, N.Y.

[21] Appl. No.: 157,500

[22] Filed: Feb. 17, 1988

[51] Int. Cl.$^5$ .............................................. G06F 7/38
[52] U.S. Cl. ............................ 364/715.09; 364/736.5
[58] Field of Search .......... 364/736.5, 715.01, 715.09, 364/715.10, 200 MS File, 900 MS File, 724.04

[56] References Cited

U.S. PATENT DOCUMENTS

| | | | |
|---|---|---|---|
| 3,983,382 | 9/1976 | Weinberger | 364/724.04 |
| 4,338,661 | 7/1982 | Tredennick et al. | 364/200 |
| 4,373,180 | 2/1983 | Linde | 364/200 |
| 4,407,015 | 9/1983 | Ziobro | 364/200 |
| 4,430,706 | 2/1984 | Sand | 364/200 |
| 4,578,750 | 3/1986 | Amdahl et al. | 364/200 |
| 4,630,192 | 12/1986 | Wassel et al. | 364/715.09 |

OTHER PUBLICATIONS

Computer Arithmetic, Principles, Architecture, and Design, by Kai Hwang, 1979, pp. 98–101.
IBM Technical Disclosure Bulletin, vol. 25, No. 1, Jun. 1982, Zero Condition Code Detection for Early Resolution of BCS and BCRS, J. J. Losq and G. S. Rao.

Primary Examiner—Gary V. Harkcom
Assistant Examiner—Long T. Nguyen
Attorney, Agent, or Firm—Baker, Maxham, Jester & Meador

[57] ABSTRACT

The invention determines when two operands are equivalent directly from the operand without the use of an adder. In one embodiment, conditions for the sum being equal to zero are determined from half sum to carry and transmit operators derived from the input operands. These operands are used in some known types of adders and, thus may be provided from a parallel adder to the condition prediction circuitry. In another embodiment, the equations for a carry-save-adder are modified to provide a circuit specifically designed for the determination of the condition when the sum of the operands is equal to zero. This sum is equal to zero circuit greatly reduces the gate delay and gate count thus allowing the central processing unit to determine the condition prior to the actual sum of two operands. This allows the CPU to react to the condition more quickly, thus increasing overall system speed.

9 Claims, 15 Drawing Sheets

METHOD AND APPARATUS FOR MODIFIED CARRY-SAVE DETERMINATION OF ARITHMETIC/LOGIC ZERO RESULTS

FIELD OF THE INVENTION

The present invention relates to the field of digital computer operations. More specifically, the present invention relates to the prediction of a condition code reflecting the result of an executing arithmetic operation.

BACKGROUND OF THE INVENTION

The performance of a computing system is vitally affected by the speed and accuracy with which arithmetic operations are performed. This is because many of the instructions executed by the computer require arithmetic operation. Arithmetic circuitry is often the most complex circuitry in the instruction execution unit of a computer in terms of the number of gates and logic levels. Therefore, arithmetic operations tend to be slow and prone to error. One important aspect of the result of arithmetic operations is the determination of condition codes.

A condition code is set by a computer to reflect the outcome of an arithmetic operation. This code assists the computer in making operational decisions which depend upon arithmetic results. Condition codes are also important in some non-arithmetic operations, such as data loading instructions involving generating data complements. It is desirable, for performance reasons, to compute a condition code concurrently with the execution of the operation on whose outcome the state of the code depends.

Typically, the condition code is employed to indicate that the result of an operation is greater than zero (GT), less than zero (LT), or equal to zero (EQ). Lt is the easiest outcome to detect, because it simply involves examining the sign bit of the result. In general, GT and EQ are more difficult outcomes to detect, because the sign bit of the result is set positive when the result is either zero or a positive quantity. Therefore, examining the sign bit of the result, when the result is equal to zero, does not indicate whether the result is zero or a positive number. However, for the result of a specific instruction on specific data, EQ and GT are mutually exclusive. Thus, determining one is sufficient for the determination of the other, once LT has been excluded.

In adder operations, the traditional method of determining the RESULT=0 (EQ) condition is to NOR all the output bits of an adder circuit in the arithmetic/logic unit (ALU). However, since many architectures require 32-bit data paths for fixed point units, they also require adders of 32 bits in width. Thus, this NORing of bits will require at least two additional stages of logic, depending on the technology used for implementation. As a higher demand is placed on improvements of cycle time, the addition of stages to an adder circuit can force the condition path to become critical, therefore pushing its computation into the next machine cycle. It is evident that early computation of the greater than zero condition will enhance the operational speed of a computer. The inventors have made the critical observation that the GT condition can be detected by the early elimination of the EQ and LT conditions.

SUMMARY OF THE INVENTION

It is an objective of the invention to provide two new apparatuses for condition code determination, where one apparatus produces the RESULT=0 (EQ) condition without the need of the critical quantities of an adder, namely the carries, and another apparatus that implicitly takes adder carries into account.

It is a further objective of the invention to produce the RESULT=0 condition in parallel with an adder, thus reducing the critical delay associated with its computation.

It is a further objective of the invention to provide implementations for the determination of condition codes that require less delay associated with the unit performing an operation.

Given that, in computer architectures, a condition code bit for arithmetic operations often reflects the "sum is zero" or "difference is zero" condition, depending on whether an add, subtract, compare, or load with two's complementation instruction is executed, and given also that some microcode instructions employ an analogous bit in a microcode condition register to convey the RESULT=0 condition, it is a further objective of the invention to produce the necessary condition codes for all instructions requiring arithmetic operations without regard to the type of machine in which they are executed. In essence, the apparatuses provided produce predicted condition codes for all possible instructions that pertain to the architectural categories of add, subtract, compare, load with two's complement and any other instructions with the same characteristics and requirements.

It is a further objective of the invention to produce condition codes for all double-precision arithmetic operations. Those double-precision instructions are used to double the bit width of the operations by saving the carry out of an add or subtract instruction and using it as the carry into the adder for the computation of the proper result.

For ease of discussion, it is assumed that the operations are performed on 32-bit operands. However, it is a further objective of the invention to derive conclusions by proper extension of the expressions, to any length operands.

One embodiment of the invention provides an apparatus that classifies all arithmetic instructions in two categories: namely, Type 0 signifying ones that require a carry into the arithmetic unit to be equal to 0, and Type 1 denoting ones that require the carry into the arithmetic unit to be equal to 1.

It is a further objective of the invention to provide circuitry and a method for executing minimized Boolean equations that do not require internal carries for both Type 0 and Type 1 instructions, implying that the circuitry will produce the condition code in parallel with the arithmetic unit, thus removing its computation from the critical path. In essence, none of the hardware of an adder (including the carries) is used for this method, and the condition is computed with less delay than the arithmetic unit itself. Furthermore, no carries of any kind are required.

It is a further objective of the invention to produce the condition code for both types of instructions using one combined set of hardware, thus providing hardware savings.

It is a further objective of the invention to determine the RESULT=0 condition using a modified carry-save adder (MCSA) that operates on operands and a forced string of ones.

It is a further objective of the invention to examine the output of the MCSA to determine if the output of the adder in the ALU operating on the operands will be equal to zero, with no need to determine the carry bits or other critical quantities.

It is a further objective of the invention to provide a second embodiment for the condition code determination with prediction.

It is a further objective of the second provided embodiment of the invention to determine for each bit position of the sum produced by an adder all the possible conditions required for that bit position to be equal to zero after an addition.

It is a further objective of the invention to determine, for the combination of two operands, the possible conditions to be as follows:

A. Both operand bits are equal to zero, and the carry-in bit is equal to zero.

B. Only one operand bit is equal to one, and the carry-in bit is equal to one.

C. Both operand bits are equal to one, and the carry-in bit is equal to zero.

It is a further objective of the second embodiment of the invention to use the previous results regarding all the possible conditions described previously to determine when the result will be equal to zero (EQ), greater than zero (GT), or less than zero (LT).

Further scope of applicability of the present invention will be apparent from the detailed description present in the sections to follow. It should be understood that the detailed description, while presenting a preferred embodiment of the invention, is given by way of illustration only, since various changes and modifications within the scope of the invention, will become obvious to one skilled in the art from a reading of the following detailed description.

BRIEF DESCRIPTION OF THE DRAWINGS

These and other objects, features and advantages of the invention will be more fully appreciated with reference to the accompanying Figures, in which.

DETAILED DESCRIPTION

A first embodiment of the present invention is described with reference to FIGS. 1 through 11. This embodiment in particular illustrates the case in which the invention is used in a computer having a 32-bit architecture. The apparatus of the invention will detect and indicate which of the conditions greater, equal to or less than zero (GT, EQ, and LT, respectively) will result from an arithmetic computation being performed on two operands. The apparatus detects and indicates the condition concurrently with the execution of the arithmetic computation.

Figure 1:
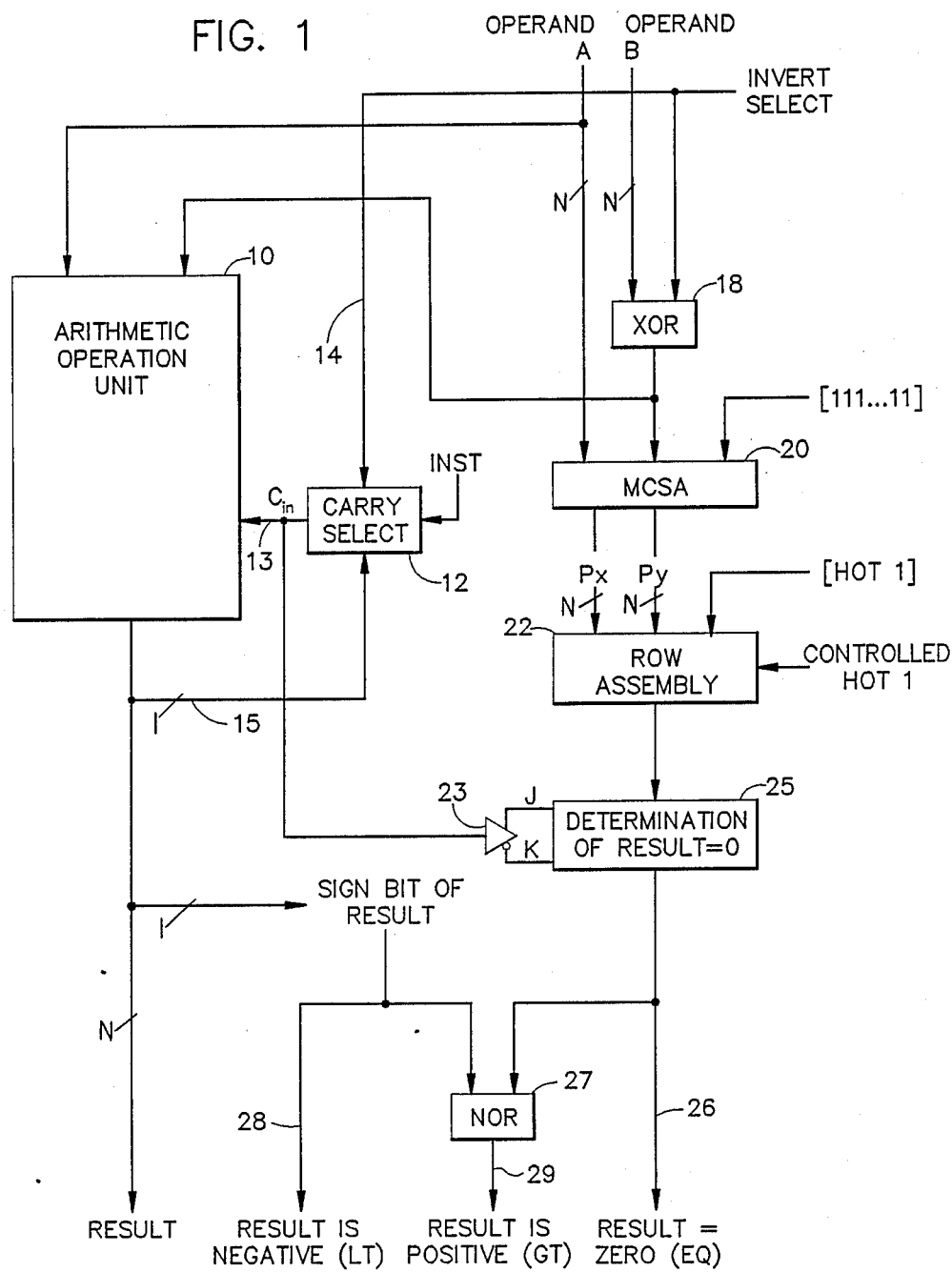
FIG. 1 is a schematic block diagram showing a first embodiment of the invention.

In FIG. 1, an arithmetic operation unit 10 performs a given arithmetic operation on two operands, A and B. The operation unit 10 may comprise any of a well-known complement of machines for executing an arithmetic operation on the operands, A and B. Such a machine may comprise, for example, an adder found in an IBM System/370 product. In FIG. 1, the operands A and B comprise 32-bit data objects. For understanding the invention, the operand A consists of bits $A_0 \ldots A_i \ldots A_{31}$, with $A_0$ the most significant bit (MSB). The bits in operand B are similarly identified as $B_i$, with i equaling $0 \ldots 31$, from most to least significant. The arithmetic operation unit 10 produces a 32-bit result R comprising result bits $R_0 \ldots R_{31}$, from most to least significant. According to convention, the MSB of R is a sign bit, which indicates that R is negative, if set to "1", and positive, or zero, if set to zero.

Assuming that the arithmetic operation unit 10 is an adder, an adjunct carry select circuit 12 operates to provide a carry-in ($C_{in}$) for arithmetic operations performed by the unit 10. The carry select circuit 12 is conventional in all respects and responds to a signal INST decoded from the current instruction, which controls the circuit 12 to connect the $C_{in}$ line 13 either to an INVERT SELECT signal line 14, or to the carry-out signal from the highest order bit stage in the unit 10. Such a circuit is known in the art, one example being found in U.S. Pat. No. 3,986,015, which is incorporated herein by reference. As is known, $C_{in}$ is conditioned by the carry select circuit 12 to indicate whether a "one" or a "zero" is to be carried into the operation currently being executed by the unit 10.

For example, $C_{in}=1$ or zero when a double-precision operation is being conducted on a pair of 64-bit operands. Such an operation is conducted in two stages, the first combining the least significant 32 bits of operands A and B, and the second the most significant bits. The signal on line 13 indicates whether there is a carry-in from the least to the most significant bits.

In another case, subtraction of operand B from operand A is performed by combining the two's complement of operand B with operand A. The two's complement of operand B is characteristically obtained in a two-step sequence in which the one's complement is generated, followed by addition of a "hot" one to the least significant bit of operand B. As is known, the "hot" one can be added after operand A has been combined with the one's complement of operand B. An INVERT SELECT signal on signal line 14 is set to "one" when operand B is to be inverted. The INVERT SELECT signal is provided to a conventional exclusive-OR (XOR) circuit 18 which performs bit-by-bit complementation of operand B. The INVERT SELECT signal is also connected to the $C_{in}$ line 13 by the carry select circuit 12 to provide a "hot" one that completes the two's complementation of operand B in the unit 10.

The first embodiment of the invention includes a modified carry save adder (MCSA) 20, a row assembly circuit 22, and a determination circuit 25. This embodiment of the invention receives operands A and B to detect and indicate when the result of the operation performed by the unit 10 will have a magnitude of zero. In the discussion to follow, this condition is indicated by the apparatus of the invention setting the signal RESULT=0 to "1". If the magnitude of the result is non-zero, the apparatus of the invention sets RESULT=0 to "0". The determination of a zero magnitude of a result by the apparatus of FIG. 1 is made concurrently with execution of the operation by the arithmetic unit 10, which will produce the result. It should be evident that early determination of a result magnitude equal to zero provides a significant advance over the prior art, where such a determination was available only *after* the result has been produced. It is manifest that early determination of the magnitude of the result will permit early indication of a positive magnitude (GT) by operation of the NOR gate 27 under the control of the RESULT=0 signal produced by the apparatus of the invention.

In the description which follows, it is assumed that the arithmetic operation unit, as well as the apparatus of the invention, operate in the context of a programmed computer which operates by executing a program consisting of a sequence of instructions. As is known, such instructions can include arithmetic instructions, which are decoded by the control unit of the computer to control the operations of the arithmetic operation unit 10.

In general, there are four different types of arithmetic instructions of interest: instructions that perform add operations, instructions that perform substract operations, instructions that perform compare operations, and instructions that perform loading operations. All of the instructions which perform add operations and the instructions which perform load operations, where no complementing is to be performed, require an adder, which performs an add operation with the carry into the adder being equal to 0. In this latter regard, $C_{in}=0$. On the other hand, all of the instructions performing subtract operations, compare operations, and the instructions performing load operations, where two's complementing is to be performed, require an add operation with $C_{in}=1$. In addition, the operand to be subtracted in a subtract operation must be supplied to the adder in the one's complement form. The one's complemented operand when added to a carry-in of 1, will result in subtraction.

In double precision operations, the operands actually comprise two 64-bit data words. Each operand is divided into to two 32-bit data words; one including the most significant bits, the other comprised of the least significant bits. First, the least significant data words must be operated on and the appropriate value of the $C_{in}$ carry bit generated. The most significant data words are then operated on with the carry bit generated from the operation on the least significant data words. For the double-precision operations, the appropriate add or subtract operation must occur on the least significant data words and $C_{in}$ must be properly set. The effect of the carry bit is explained below.

The INVERT SELECT control signal causes operand B to be inverted bit-by-bit in XOR circuit 18 when a subtraction operation is to be performed and the INVERT SELECT control signal is a logical 1. When the INVERT CONTROL signal is a logical 0, B passes through XOR gate bank 18 uninverted.

For an understanding of this embodiment, arithmetic instructions can be classified into two different categories: instructions with $C_{in}=0$, hereafter referred to as Type 0 instructions, and instructions with $C_{in}=1$, hereafter referred to as Type 1 instructions. The RESULT=0 condition prediction is examined for both of the instruction types in Appendixes A and B.

Appendix A sets forth, in detail, the development of a Boolean expression that predicts the condition of the RESULT=0 condition for Type 0 instructions. The expression is given in equation (A.3):

$$\text{``Result}_{Type0} = 0\text{''} = Px_{31} \cdot [(Px_0 V Py_1) \cdot (Px_1 V Py_2) \cdot \ldots \cdot (Px_{30} V Py_{31})] \quad (A.3)$$
$$= Px_{31} \cdot \bar{D}$$

where:
$D = [(Px_0 \text{ V } Py_1)(Px_1 \text{ V } Py_2) \cdot \ldots \cdot (Px_{30} \text{ V } Py_{31})]$ It can be observed that the computation of RESULT=0, for Type 0 instructions, requires no carry propagation. Because the RESULT=0 signal is not delayed by the need for carries to ripple through all of the bit positions, the implementation of equation (A.3) requires less delay as compared to any other existing scheme for predicting the RESULT=0 condition code.

Appendix B develops the Boolean expression that predicts the condition of the RESULT=0 signal for Type 1 instruction. The expression is given by equation (B.3):

$$\text{``Result}_{Type1} = 0\text{''} = Px_{31}' \cdot [(Px_0 V Py_1) \cdot (Px_1 V Py_2) \cdot \ldots \cdot (Px_{30} V Py_{31})] \quad (B.3)$$
$$= Px_{31}' \cdot D$$

where:
$D = [(Px_0 \text{ V } Py_1) \cdot (Px_1 \text{ V } Py_2) \cdot \ldots \cdot (Px_{30} \text{ V } Py_{31})]$ By comparing equation B.1 of Appendix B with equation A.1 of Appendix A, it can be seen that the same hardware can be used to produce $Px_i$ and $Py_i$ for both instruction types with $C_{in}=0$ and $C_{in}=1$. Also, a comparison of equations (A.3) and (B.3) reveals that they are identical except for the inclusion of $Px_{31}$ in A and $Px_{31}'$ in B.

For the prediction of the RESULT=0 condition to work for all instruction types with $C_{in}=0$ and $C_{in}=1$, equations (A.3) and (B.3) of Appendices A and B must both be used with instruction selection performed on each. Therefore, the general RESULT=0 condition can be expressed as follows:

$$\text{RESULT}=0=(J \cdot Px_{31} \cdot D)|(K \cdot Px_{31}' D)=D \cdot [(J \cdot Px_{31})|(K \cdot Px_{31}')] \quad (1)$$

where:
J is a select line for Type 0 instructions
K is a select line for Type 1 instructions
$D = [(Px_0 \text{ V } Py_1)(Px_1 \text{ V } Py_2) \cdot \ldots \cdot (Px_{30} \text{ V } Py_{31})]$ The apparatus of the invention is derived from equation (1) and with reference to equations (A.3) and (B.3). With reference to FIG. 1, and to equations (A.3), (B.3), and (1), the first embodiment of the invention is shown in detail in FIGS. 6–11. In FIGS. 6–11, the MCSA 20 develops the intermediate terms $Px_i$ and $Py_i$, embraces the array of exclusive-or INVERT (XORI) gates 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, and 92 and OR gates 31, 33, 35, 37, 39, 41, 43, 45, 47, 49, 51, 53, 55, 57, 59, 61, 63, 65, 67, 69, 71, 73, 75, 77, 79, 81, 83, 85, 87, 89, and 91.

Each of the XORI gates of the modified carry-save adder 20 receives correspondingly-numbered bits of the A and B operands to produce the corresponding Pxi term according to equations (A.1.a) and (B.1.a). The OR gates of the adder 20 likewise develop the Pyi intermediate terms according to equations (A.1.b) and (B.1.b). The intermediate terms Px and Py are provided by the carry-save adder as ordered sequences Pxi and Pyi, without regard to the form of operand B. In this regard, the carry-save adder 20 develops the intermediate term whether or not operand B is in one's complement form.

The row assembly circuit 22 is embodied in the exclusive-OR (XOR) gates 100–130. The row assembly circuit receives the first sequence of intermediate terms, Pxi and Pyi, and combines those terms to produce a second array of intermediate terms corresponding to Px+Py. In this regard, the row assembly produces the concatenation of equations (A.2) and (B.2); the ordered sequences of these equations are equivalent in all of their elements except the elements which combine $Px_{31}$ with "+1" and "+1+1", respectively.

The circuit 25 which generates and conditions the signal RESULT=0 includes the combination of the AND gates 140–144, the SELECT circuit 150 and the AND gate 160. As is evident, the AND gates 140–144 generate a signal that represents one of the D(i,i+5) terms in equation (A.3.a). The SELECT circuit 150 responds to the J and K signals to select the positive or inverted value for $Px_{31}$ as required by equation (1). The J and K signals are illustrated symbolically by a driver 23 whose input is connected to the $C_{in}$ line 13, and which provides, as complementary outputs, the J and K signals to the circuit 25. It is to be understood that the driver circuit 23 is only symbolic of generation of the J and K signals; these could also be provided through conventional instruction decoding. However, the driver 23 does convey the nexus between the value of $C_{in}$, the J and K signals, and the categorization of instructions. Finally, the AND gate 160 collects and combines the intermediate D terms produced by the AND gates 140–144 with the D 30 term produced by the XOR gate 130 and the value of $Px_{31}$ provided by the SELECT circuit 150 in response to the J, or K, signal. In this regard, the J signal will be true when a Type 0 instruction is being executed, which will provide the positive sense of $Px_{31}$ to the AND gate 160. Similarly, during execution of a Type 1 instruction, the K signal will be true, causing the SELECT circuit 150 to provide the complementary value of $Px_{31}$ to the AND gate 160. The RESULT=0 signal is generated by the AND gate 160 and provided as an output on signal at 26 from the circuit 25 (FIG. 1).

In computer design, the computation of the condition code is of interest. Given that the "greater than zero" condition is indicated by the negation of RESULT=0, it can be concluded that its calculation can be derived directly from the RESULT=0 determination, assuming that the "less than zero" condition has been excluded. Thus, the RESULT=0 condition, its negations, and the sign bit of the result determine the condition code. Such a calculation has been described in FIG. 1 and is provided on output signal paths 28 and 29 and the "result is positive" is provided by NORing the "result is negative" and RESULT=0 in NOR gate 27.

Figure 12:
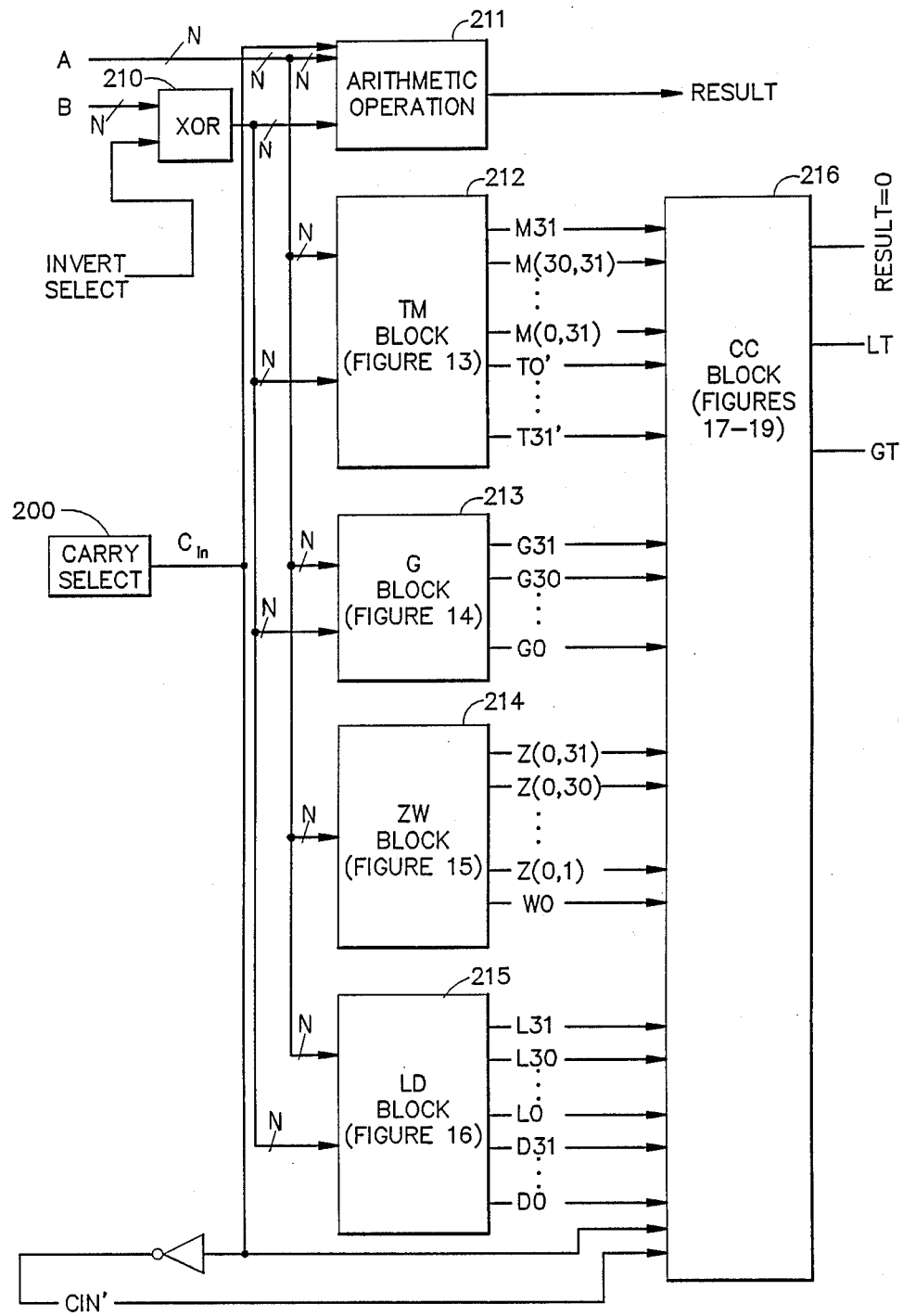
FIG. 12 is a schematic block diagram showing a second embodiment of the invention.

A second embodiment of the present invention is shown in FIG. 12. The apparatus of the second embodiment, as shown in FIGS. 12, and 13 through 19, in particular, illustrates the case in which the system uses a 32-bit operation. The apparatus will detect the conditions greater, equal to, or less than zero of an arithmetic computation performed on two thirty-two bit operands.

In the second embodiment, a given arithmetic operation is performed on operands A and B by arithmetic operation unit 211. Arithmetic operation unit 211 performs the same functions as arithmetic operation unit 10 of FIG. 1. Also, A and B are presented simultaneously to blocks 211 through 215 in FIG. 12 after B has been bit-by-bit complemented in XOR gate bank 210 in FIG. 12, in response to the invert select control, if necessary. A carry select circuit 200 generates $C_{in}$ for operation of the unit 211.

The second embodiment of the invention operates in parallel to the arithmetic operation unit 211 to predict the three possible conditions of the result, that is, RESULT=0, LT and GT. In the second embodiment, the prediction of the state of the RESULT=0 signal is accomplished by a logical combination of intermediate terms developed in a transmit circuit block (TM BLOCK) 212, a generate circuit block (G BLOCK) 213, and an auxillary circuit block (ZW BLOCK) 214. In addition, terms for predicting the respective states of the LT and GT conditions are generated by a second auxillary logic block (LD BLOCK) 215. The intermediate terms developed by all of the circuit blocks 212–215 are provided, together with the positive sense and the complement of $C_{in}$ to a condition code circuit block (CC BLOCK) 216, which develops the three condition code signals of interest.

Refer now to Appendix C and to FIGS. 12–19 for an understanding of the expressions and circuits which characterize the circuit blocks 212, 213, 214, 215, and the portion of the CC block 216 which develops the RESULT=0 signal.

Figure 13:
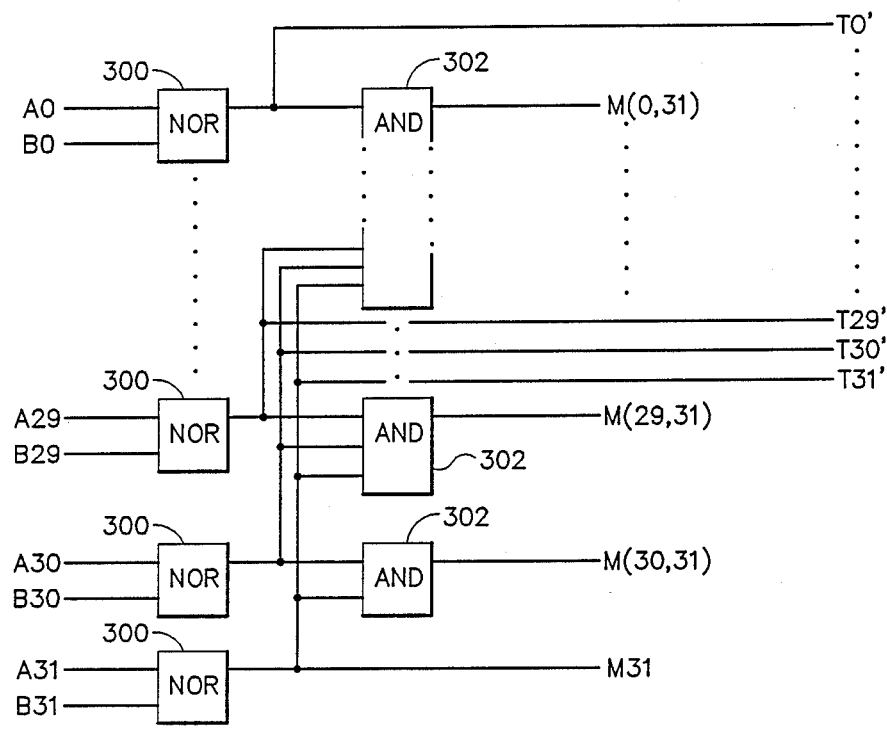
FIGS. 13-19 are schematic diagrams illustrating details of elements of the embodiment of FIG. 12.

As shown in FIG. 12, the TM block 212, illustrated in greater detail in FIG. 13, develops the transmit terms T(i) and the group transmit terms M(i,j). FIG. 13 illustrates the transmit terms generated by NOR gates 300, each of which receives a respective pair of corresponding operand bits A(i) and B(i) to produce the corresponding transmit term T(i). The transmit terms are collected by AND gates 302 to produce the group transmit terms M(i,j).

Figure 14:
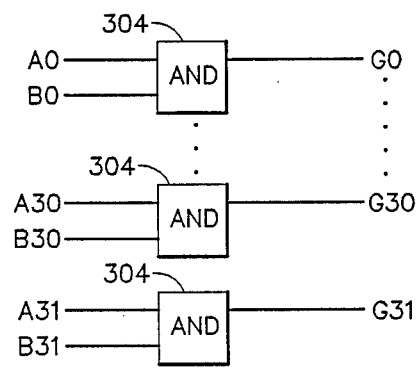

The generate terms G(i) are generated by the G block 213, illustrated in detail in FIG. 14. Each generate term G(i) is produced by a respective one of the AND gates 304 in response to operand bits A(i) and B(i).

Figure 15:
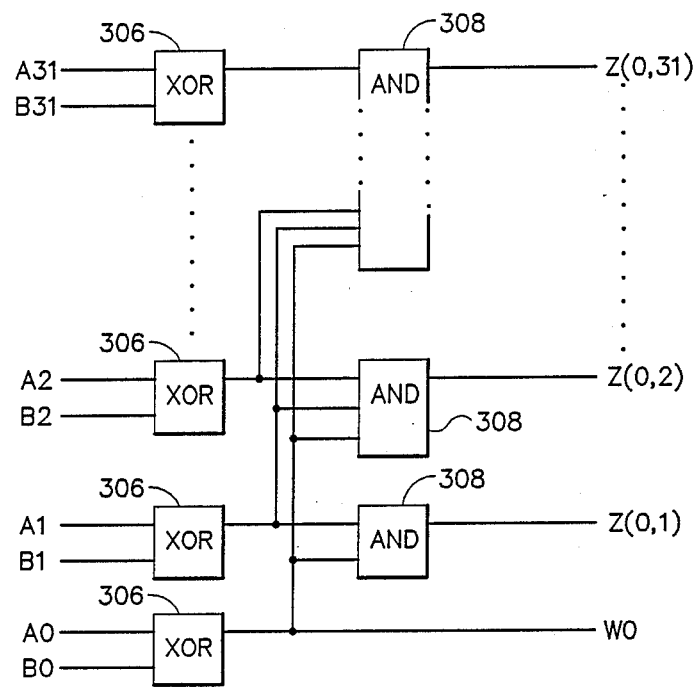

The Zw block 214 is illustrated in FIG. 15. In the Zw block 214, each Z term is developed by combination of one of the AND gates 308 with two or more of the XOR gates 306. Each of the XOR gates 306 receive corresponding operand bits A(i) and B(i) and produces a signal fed to one or more of the AND gates 308. It is noted that the XOR gate 306 which receives operand bits A(0) and B(0) produces the half-sum W(0), as shown in FIG. 15.

Figure 17:
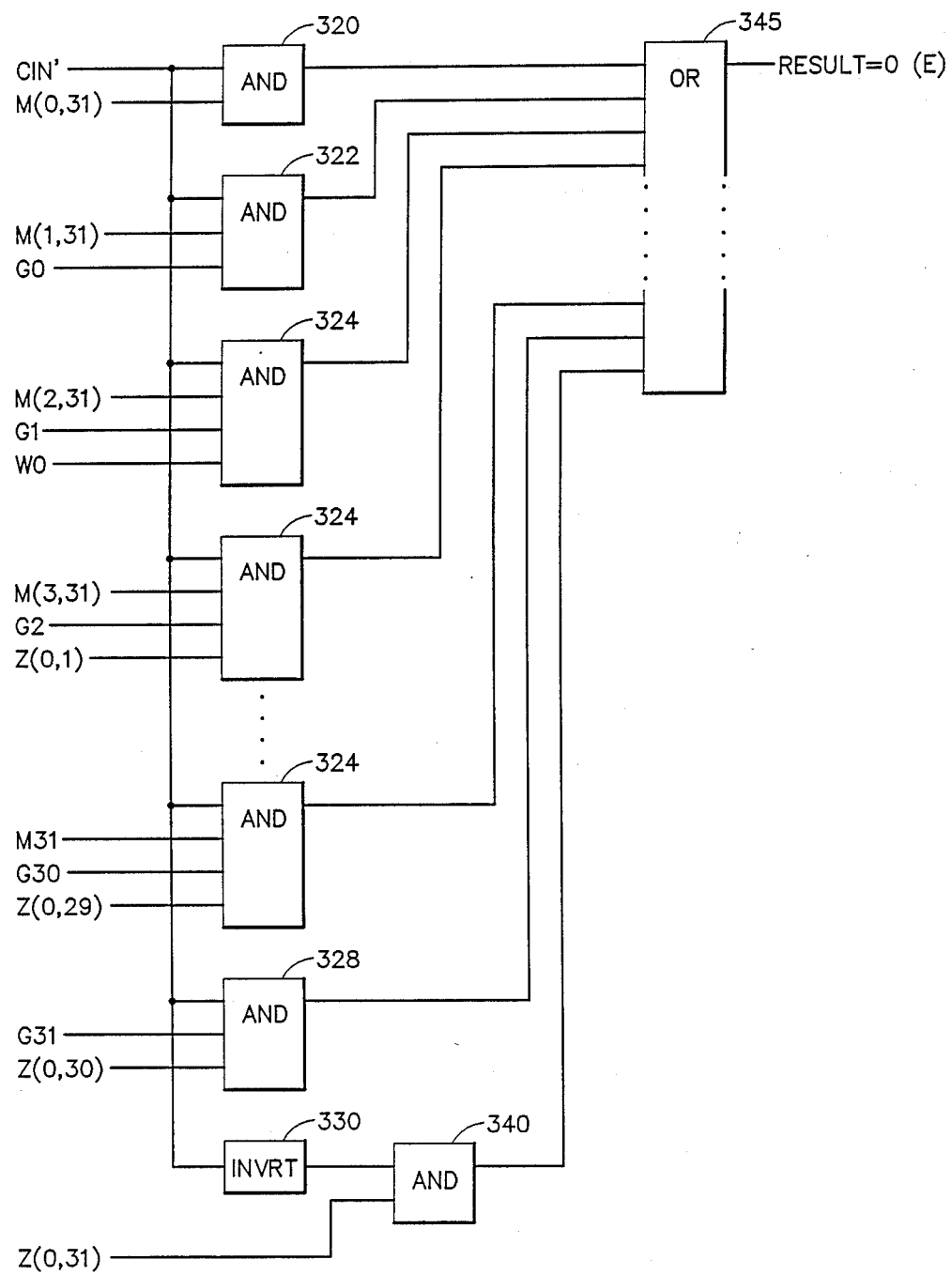

The RESULT=0 portion of the CC block 216 is illustrated in detail in FIG. 17. With reference to the sequences described in Appendix C, in FIG. 17, the first sequence, $T(0)'·T(1)'·\ldots·T(M-1)'$ with $C_{in}=0$ is generated by the AND gate 320 which receives, as inputs, the group transmit M(0, 31) and $C_{in}'$. Thus, when the first sequence occurs, the output of the AND gate 320 assumes a positive state. Similarly, the AND gate 322 receives the group transmit M(1, 31), the generate G(0) and $C_{in}'$ signals to monitor sequence (2.b) providing a positive output when the sequence occurs. The AND gates 324 each receive a respective group of intermediate signals comprising a generate signal G(i), a group transmit signal, M(i+1, N−1), and a group half-sum signal W(0) when i=1, or Z(0, i−1), for i>0. Each of the AND gates 324 also receives the $C_{in}'$ signal, and produces a high output whenever the respective instantiation of sequence (2) that it represents, occurs. AND gate 328 receives the generate signal G(31) and the group half-sum Z(0, 30), together with $C_{in}'$ to detect sequence (2.a). AND gate 328 provides a high output whenever this sequence occurs. The third sequence described in Appendix C is detected by AND gate 340, which receives a positive sense of $C_{in}'$ through the inverted 330 and combines it with the group half-sum signal Z(0, 31). The OR gate 345 collects the outputs of these AND gates 320 and generates "RESULT=0" =1 whenever the output of any one of the AND gates of FIG. 17 goes high. Of course, if none of the three sequences described in Appendix C is satisfied for the two current operands, the circuit of FIG. 17 sets "RESULT=0" to 0.

As RESULT=0 is predicted in parallel with the adder, the path delay for this function will be reduced over previous implementations. Since most ALU designs require an adder, many of the terms required for the result equal to zero predict function will be already generated for the adder. Consequently, the implementation costs will be minimized over an independent implementation of the equal to zero function.

Figure 16:
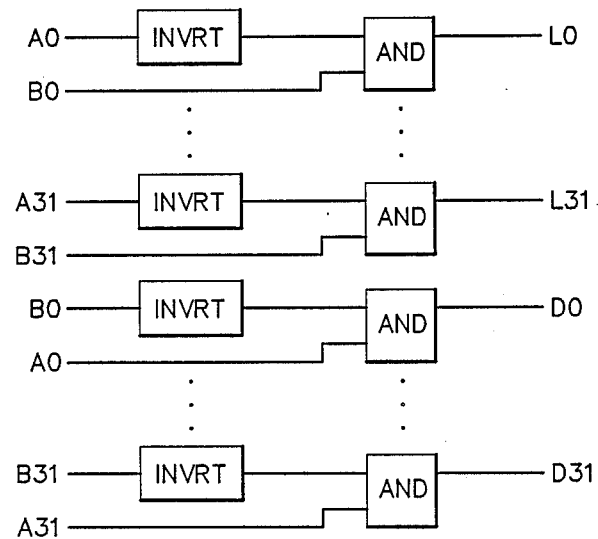

Finally, provision is made by way of the LD block 215, for predicting the LT and GT conditions in cooperation with prediction of the state of RESULT=0. The LD block is described precisely by the terms L(i) and D(i) of Appendix D, and is illustrated in FIG. 16.

To know the three conditions (less than, greater than, and equal to), only two have to be generated. The third condition is known from the other two condition codes. Calculating 'equal to' should be a small subset of the generating logic. Both 'less than' and 'greater than' are generated here but only one has to be used.

Both LT and GT are determined by one-to-one bit comparison of the operand bit strings from most to the least significant bit until an inequality occurs. The first inequality determines which bit string is considered to be 'greater than' and which bit string is considered 'less than'.

All comparisons occurring before the first inequality are ignored, since the bit strings are equivalent up to that bit position. Likewise, all comparisons occurring after the first inequality should be ignored, since their magnitude is less significant than the position of the first inequality. A Boolean derivation of equations based on this principle can be found in Appendix D.

For any length operand big string, the functions derived LT and GT in Appendix D will provide a result (assert) only if at least one set of bits in the same position in both strings is different. The function will assert for only the most significant bit position where the bits in both strings are different. If the function is 'A less than B', then the LT function will assert only if the magnitude of bit string A is less than bit string B. If the function is 'A greater than B', then the GT function will assert only if the magnitude of bit string A is greater than bit string B. By utilizing already generated adder terms, the implementation costs for the 'less than' and 'greater than' functions can be reduced.

Figure 18:
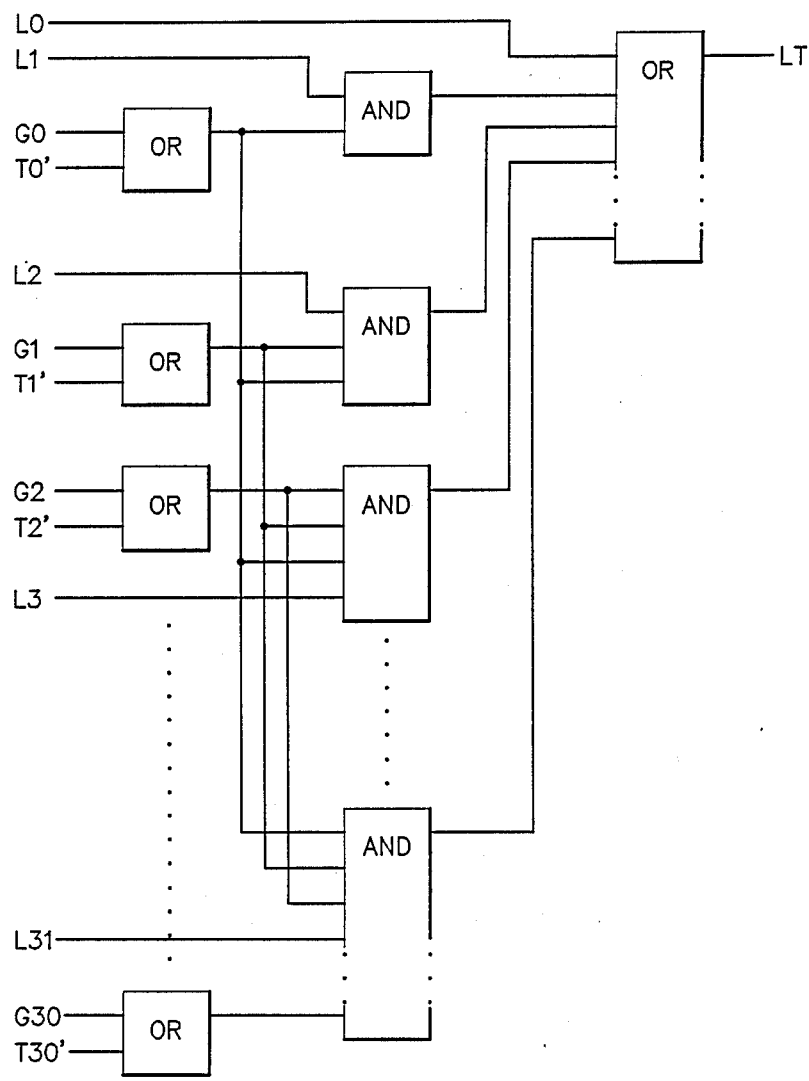

The question of LT and GT by the condition code block 216 is shown in FIGS. 18 (LT) and 19 (GT), which implement the respective Appendix D equation for those terms.

APPENDIX A

Calculation of Result=0 for $C_{in}=0$

The following discussion comprises the detailed description of the first proposed apparatus. The term "most significant bit" indicates the most lefthand bit, and is bit position 0. The term "least significant bit" indicates the most righthand bit, and the bit position is the bit string length N minus 1. For clarification, the following notations will be used:

1. | represents logical OR
2. · represent logical AND
3. V represents logical exclusive-OR
4. + represents addition
5. − represents subtraction
6. A' is the one's complement of A
7. || represents concatenation.

For instructions with $C_{in}=0$ (Type 0 instructions), the three input MCSA 20 of FIG. 1 is used to express the following relationship:

$$A+B=(A+B-1)+1=Px+Py+1$$

where:

$Px+Py=(A+B-1)$

Figure 2:
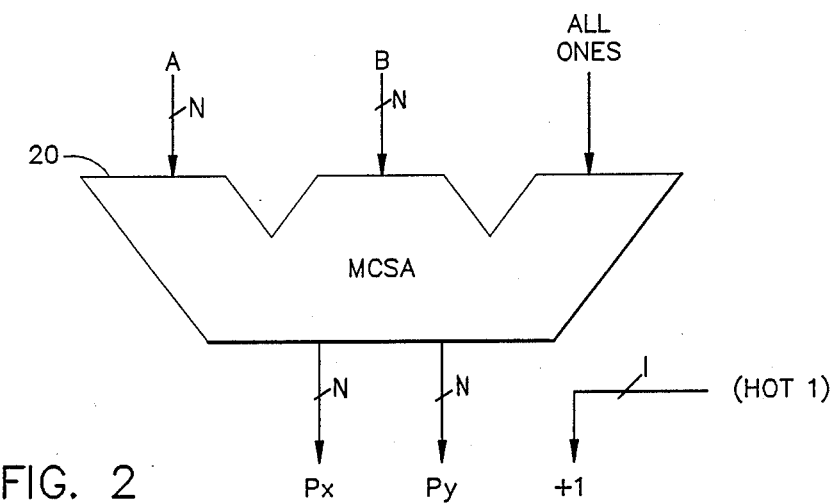
FIG. 2 and FIG. 3 are schematic diagrams showing details of the embodiment of FIG. 1 comprising the Modified Carry-Save Adder (MCSA) and its inputs, outputs, and the additional inputs to the row assembly block.
Figure 3:
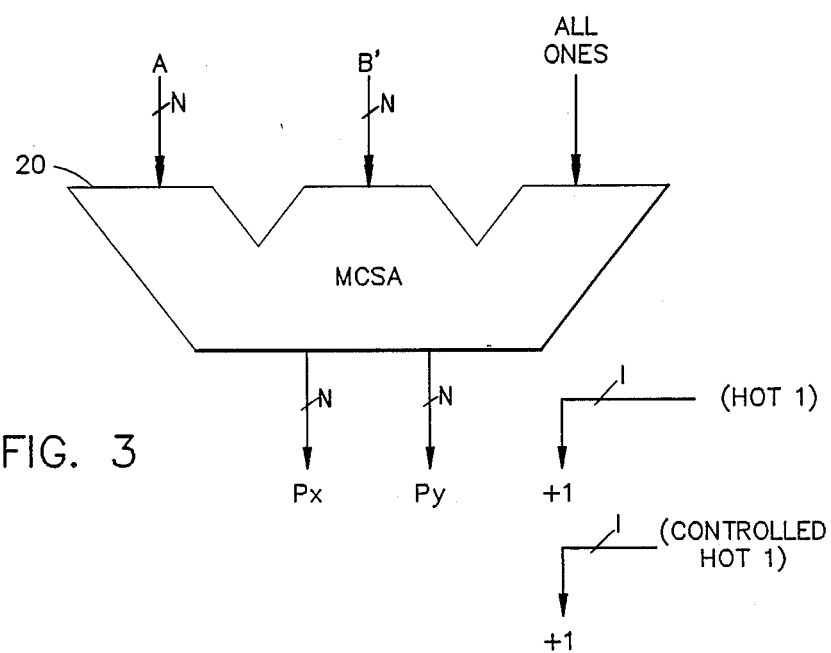

Given that −1, in two's complement notation, is equivalent to [111 ... 1111], for every bit i of Px and Py, the following holds true:

$$Px_i = A_i \text{ V } B_i \text{ V } 1 = (A_i \text{ V } B_i)' \qquad (A.1.a)$$

and $$Py_i = (A_i \cdot B_i)|(A_i \cdot 1)|(B_i \cdot 1) = A_i|B_i \qquad (A.1.b)$$

which describes in equation form the operation of MCSA 20 of FIGS. 1–3. The intermediate result signals, Px and Py, produced by the MCSA 20, are combined in the now assembly 22 by adding all but the most significant bit of Py to Px with Py being shifted relative to Px by one bit. For 32-bit operands, this is represented in equation format by:

$$Px+Py=(Px_0+Py_1)||(Px_1+Py_2)||\dots \\ ||(Px_{30}+Py_{31})||Px_{31} \qquad (A.1)$$

Figure 4:
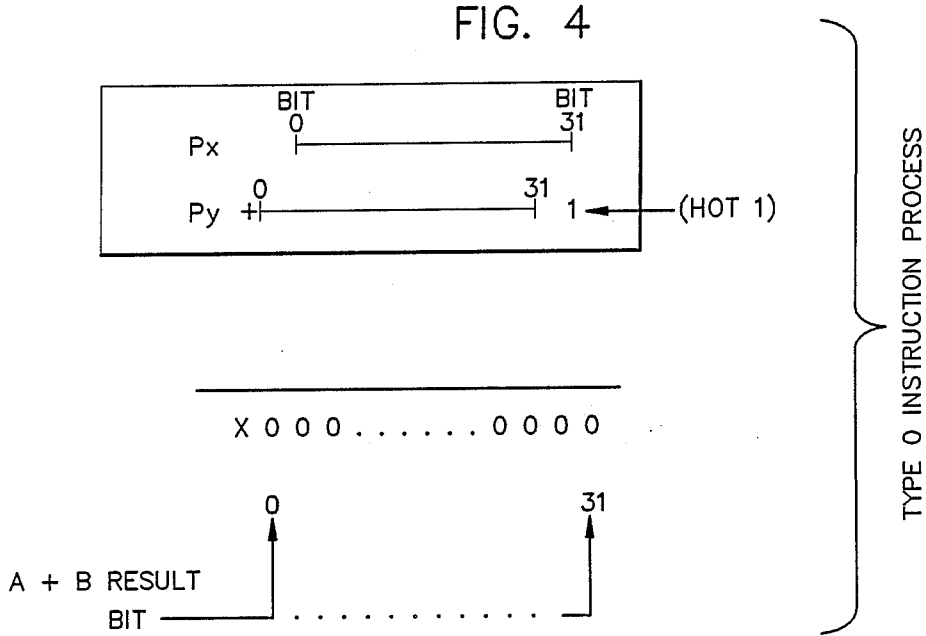
FIG. 4 and FIG. 5 are schematic diagrams showing a detail of the row assembly block of FIG. 1.

This equation is shown graphically in FIGS. 2 and 4. In order to balance the equations, a "hot 1" is added in the least significant bit position vacated by the shift of Py.

In order for the result of A+B to be equal to zero, Px+Py, from equation (A.1) above, added to the "hot 1", as shown in FIG. 4, must also be equal to zero.

Therefore, the condition RESULT=0 will be true if and only if the following holds true:

$$Px+Py+1=(Px_0+Py_1)|(Px_1+Py_2)||\dots \\ ||(Px_{30}+Py_{31})||(Px_{31}+1)=0 \qquad (A.2)$$

Equation (A.2) is shown graphically in FIG. 4 an addition operand. Since the "hot 1" is added to $Px_{31}$, the only way that the result bit 31 can be equal to 0 is if $Px_{31}$ is equal to 1. If this is true, result bit 31 will be equal to 0 and a carry propagation to bit position 30 will occur. Since the carry into bit position 30 is equal to 1, one and only one of the bits ($Px_{30}$ or $Py_{31}$) must be equal to 1 in order for the result bit 30 to be equal to zero. If this is true, carry propagation to bit position 29 will occur and in order for the result bit 29 to be equal to 0, one and only one of the bits ($Px_{29}$ or $Py_{30}$) must be equal to 1. This propagation effect can be extended to all bit positions. The implication is that one of $Px_i$, $Py_{i+1}$ must be equal to 1, but not both, in order for $A_i + B_i$ to be equal to zero. Expressed in equation format, $$\text{"Result}_{Type0} = 0_i\text{"} = Px_i \text{ V } Py_{i+1}$$

will compute the condition for a given result bit position, i, being equal to zero. For bit position 31, given the addition of the "hot 1", $$\text{"Result}_{Type0} = 0_{31}\text{"} = Px_{31}$$

Therefore, in order for the result of $A + B$ to be equal to 0, the following must hold true:

$$\text{"Result}_{Type0} = 0\text{"} = Px_{31} \cdot [(Px_0 V Py_1) \cdot (Px_1 V Py_2) \cdot \ldots \cdot (Px_{30} V Py_{31})] \quad \text{(A.3)}$$
$$= Px_{31} \cdot D$$

where:
$D = [(Px_0 \text{ V } Py_1) \cdot (Px_1 \text{ V } Py_2) \cdot \ldots \cdot (Px_{30} \text{ V } Py_{31})]$
The signal D is further defined as:

$$D = D(0,5) \cdot D(6,11) \cdot D(12,17) \cdot D(18,23) \cdot D(24,29) \cdot D(30)$$

where:
$D_{30} = (Px_{30} \text{ V } Py_{31})$, and
$D(i,i+5) = (Px_i \text{ V } Py_{i+1}) \cdot (Px_{i+1} \text{ V } Py_{i+2}) \cdot \ldots \cdot (Px_{i+5} \text{ V } Py_{i+6})$

APPENDIX B

Calculation of RESULT=0 for $C_{in}=1$

The following discussion comprises the detailed description of the first proposed apparatus. The term "most significant bit" indicates the most lefthand bit, and is bit position 0. The term "least significant bit" indicates the most righthand bit, and the bit position is the bit string length N minus 1. For clarification, the following notations will be used:
1. | represents logical OR
2. · adjacent operands represent logical AND
3. V represents logical exclusive-OR
4. + represents addition
5. − represents subtraction
6. A' is the one's complement of A
7. || represents concatenation.

For instructions with $C_{in}=1$ (Type 1 instructions), the MCSA 20 of FIG. 1 is used to express the following relationship:

$$A - B = A + B' + 1$$
$$= (A + B' - 1) + 1 + 1$$
$$= Px + Py + 1 + 1$$

where:
$Px + Py = (A + B' - 1)$

Given that $-1$, for the two's complement notation, is equivalent to [111 ... 111], for every bit i of Px and Py, the following holds true:

$$Px_i = A_i \text{ V } B'_i \text{ V } 1 = (A_i \text{ V } B'_i)' \quad \text{(B.1.a)}$$

and $$Py_i = (A_i \cdot B'_i) | (A_i \cdot 1) | (B'_i \cdot 1) = A_i | B'_i \quad \text{(B.1.b)}$$

which describes in equation form the operation of modified carry-save adder (MCSA) 20 of FIG. 3. The intermediate result signals produced by the MCSA, Px and Py, are combined by adding all but the most significant bit of Py to Px with Py being shifted by one bit. For 32-bit operands, this is represented in equation format by:

$$Px + Py = (Px_0 + Py_1) || (Px_1 + Py_2) || \ldots \\ || (Px_{30} + Py_{31}) || Px_{31} \quad \text{(B.1.)}$$

Figure 5:
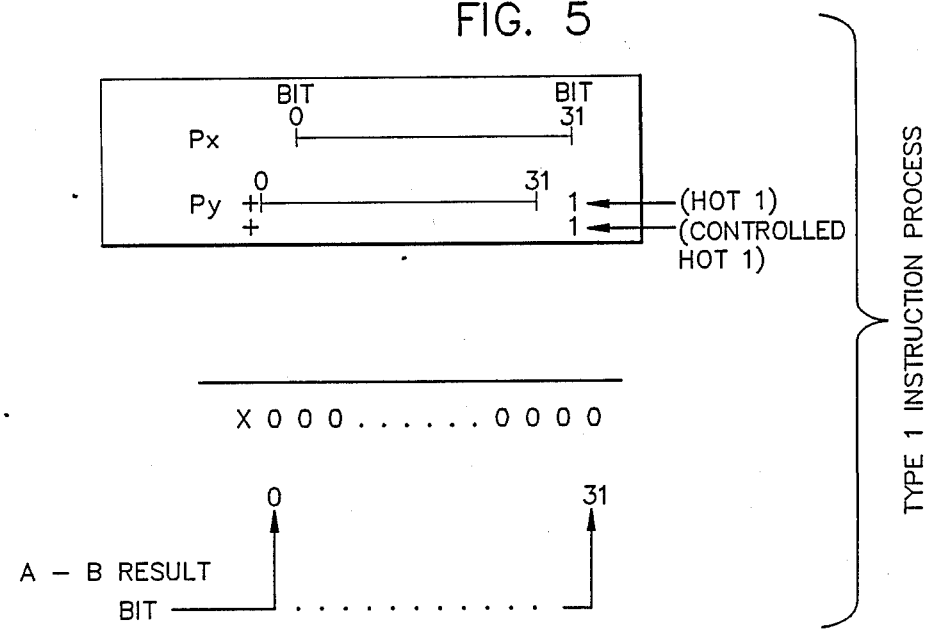
Figure 6:
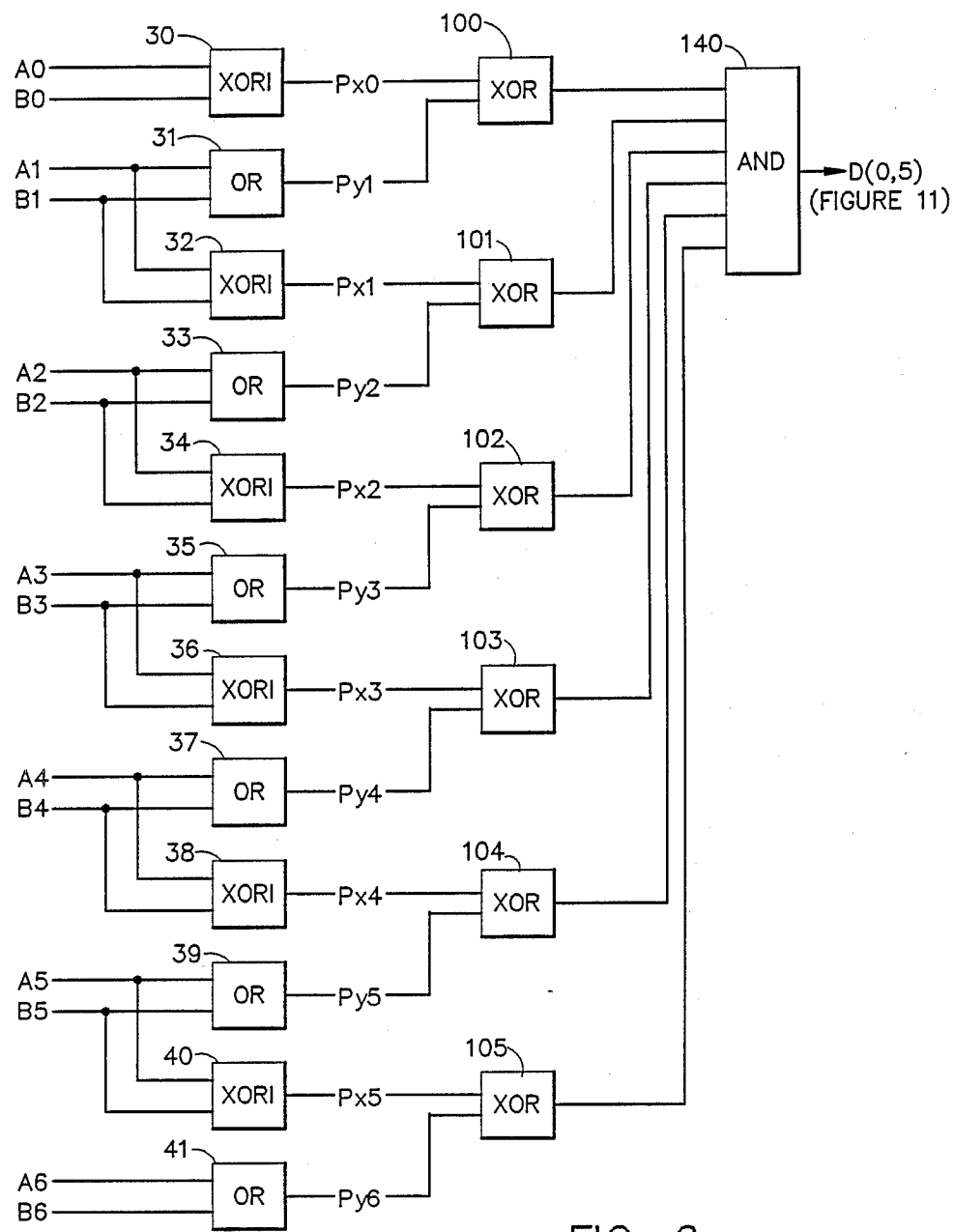
FIGS. 6 through 11 are schematic diagrams showing a detail of the embodiment of FIG. 1 comprising the implementation of the EQ condition.
Figure 7:
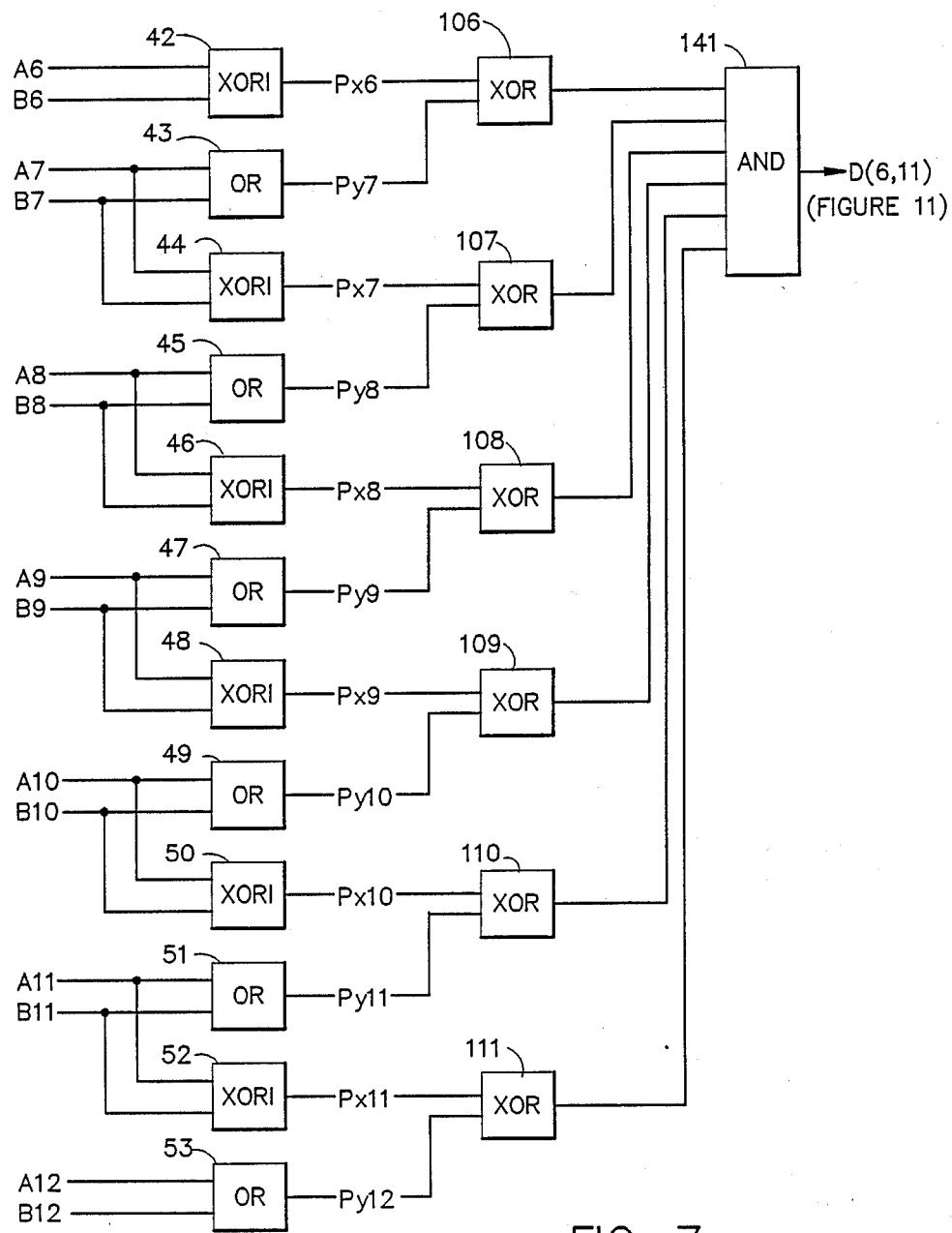
Figure 8:
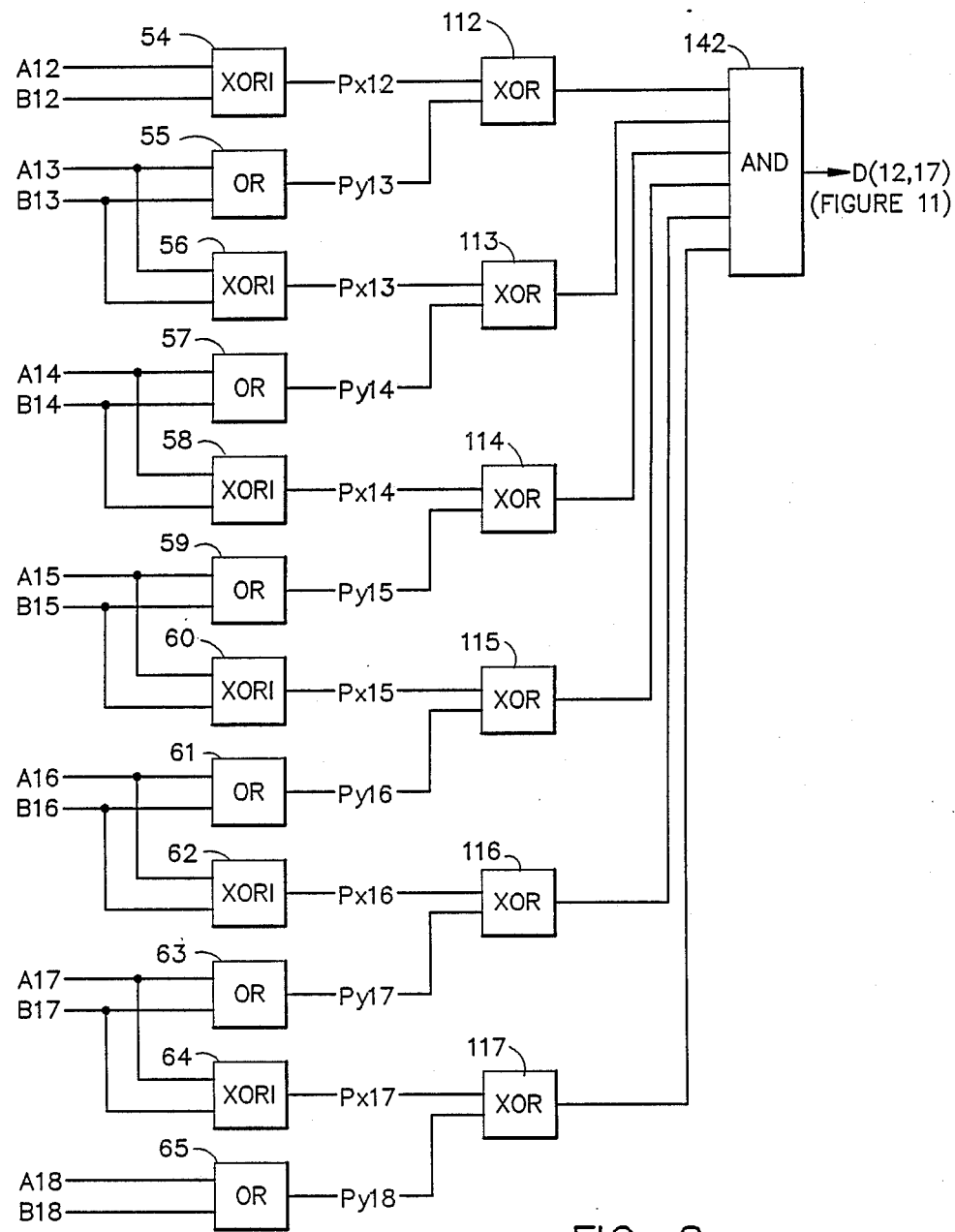
Figure 9:
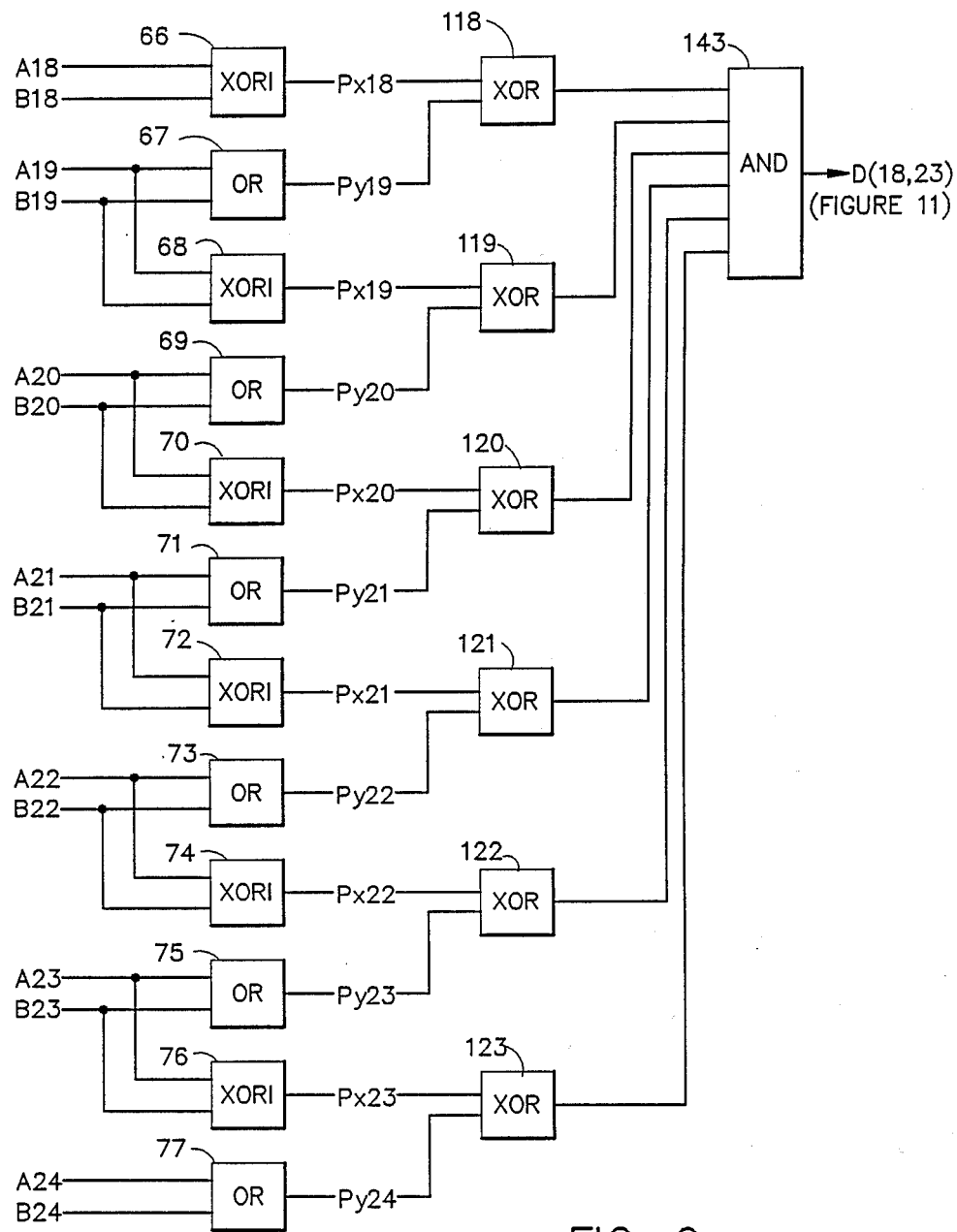
Figure 10:
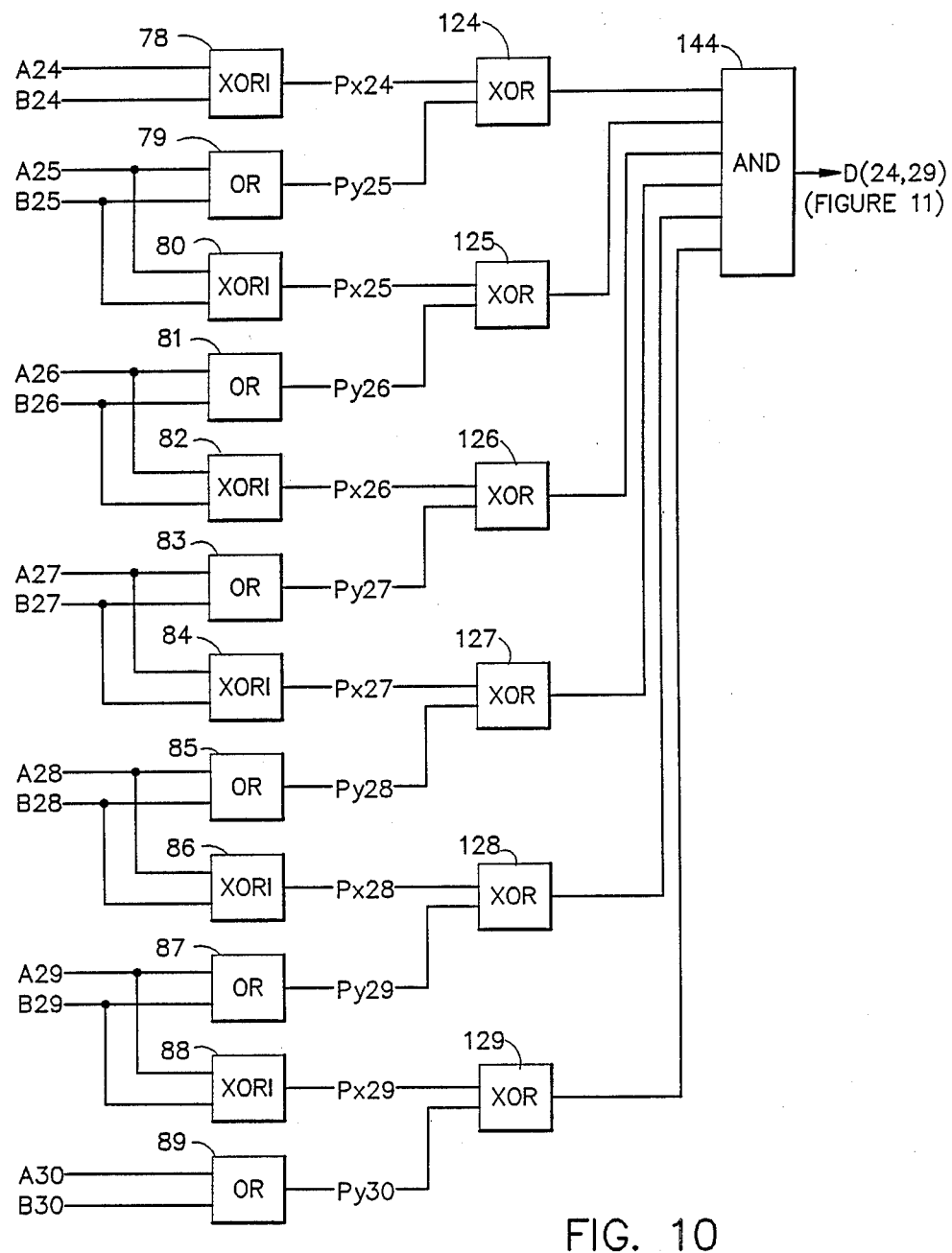
Figure 11:
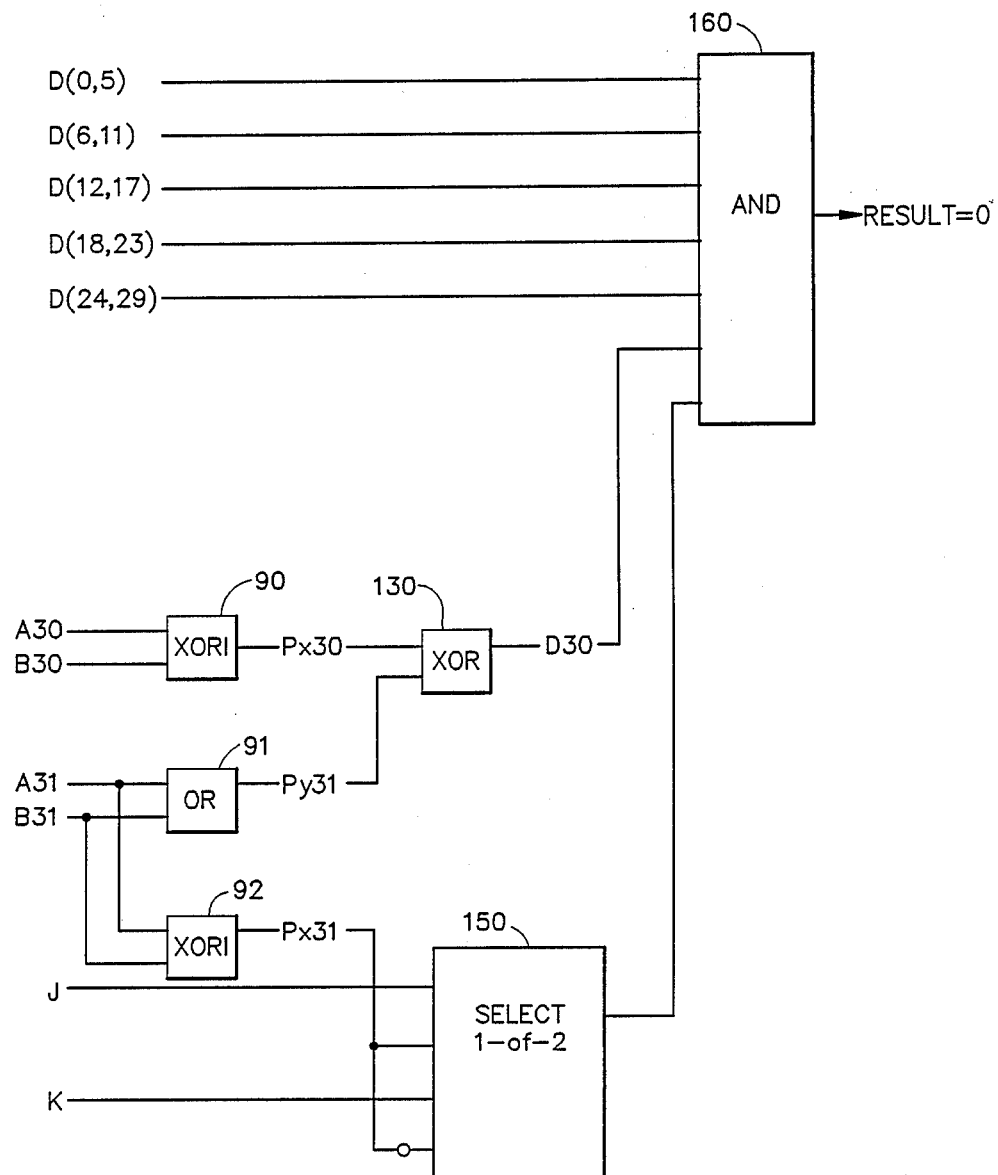

This equation is shown graphically in FIGS. 3 and 5. The first "hot 1" is added to balance the equation for the $-1$ added to determine Px and Py. The second "hot 1" (controlled hot 1) is added because B' is provided in one's complement form. A 1 must be added to compensate for the one not added to the one's complement form to change it to the proper two's complement form.

In order for the result of $A + B$ to be equal to zero, $Px + Py$, from equation (B.1) above added, to the two "hot 1"s, as shown in FIG. 5, must also be equal to zero.

Therefore, the condition RESULT=0 will be true if and only if the following holds true:

$$Px + Py + 1 + 1 = (Px_0 + Py_1) || (Px_1 + Py_2) || \ldots || \\ (Px_{30} + Py_{31}) || (Px_{31} + 1 + 1) \quad \text{(B.2)}$$
$$= 0$$

Equation (B.2) is shown graphically as an addition operation in FIG. 5. Since the two "hot 1"s are added to $Px_{31}$, the only way that the result bit 31 can be equal to 0 is if $Px_{31}$ is equal to 0. If this is true, result bit 31 will be equal to 0 and a carry propagation to bit position 30 will occur. Since the carry into bit position 30 is equal to 1, one and only one of the bits ($Px_{30}$ or $Py_{31}$) must be equal to 1 in order for the result bit 30 to be equal to zero. If this is true, carry propagation to bit position 29 will occur and in order for the result bit 29 to be equal to 0, one and only one of the bits ($Px_{29}$ or $Py_{30}$) must be equal to 1. This propagation effect can be extended to all bit positions. The implication is that one of $Px_i$, $Py_{i+i}$ must be equal to 1, but not both, in order for $A_i + B_i$ to be equal to zero. Expressed in equation format, $$\text{"Result}_{Type\ 1} = 0_i\text{"} = Px_i \text{ V } Py_{i+1}$$

will compute the condition for a given result bit position, i, being equal to zero. For bit position 31, given the addition of the "hot 1", $$\text{"Result}_{Type\ 1} = 0_{31}\text{"} = Px_{31}'$$

Therefore, in order for the result of $A + B$ to be equal to 0, the following must hold true:

$$\text{"Result}_{Type1} = 0\text{"} = Px_{31}' \cdot [(Px_0 V Py_1) \cdot (Px_1 V Py_2) \quad \text{(B.3)}$$
$$\cdots \cdot (Px_{30} V Py_{31})]$$
$$= Px_{31}' \cdot D$$

where:

$D = [(Px_0 \text{ V } Py_1) \cdot (Px_1 \text{ V } Py_2) \cdot \ldots \cdot (Px_{30} \text{ V } Py_{31})]$

APPENDIX C

For clarification, the following notations, Boolean equivalences and definitions will be used in the description of the second apparatus.

I. Notations (1) ' is the complement of the expression or term
(2) (a|b) is "a" logical OR "b"
(3) (ab) is "a" logical AND "b"
(4) (a V b) is "a" exclusively-OR'd with "b"

II. Boolean Equivalencies (1.1) 1 V a = a'

III. Transmit (T), Generate (G), and Half-sum (W) Functions For Addition (1.2) $T(i) = A(i) | B(i)$
(1.3) $G(i) = A(i)B(i)$
(1.4) $W(i) = A(i) \text{ V } B(i)$
(1.5) $Sum(i) = A(i) \text{ V } B(i) \text{ V } C(i+1)$ Where:

N = width of addition
$0 <= i <= N-1$
A(i) = input operand bit position i
B(i) = input operand bit position i
C(i+1) = carry into bit position i
C(N) = carry into the least significant bit of the adder To determine if the result of an add will be equal to zero, the add itself does not have to be done. It is necessary only to check that the requirements for summing to zero are met by the two operands.

For any bit A(i) in operand A, and corresponding bit B(i) in operand B, only certain bit combinations will generate a zero in bit i of the add result. The combinations are as follows:

Case 1. Bit i in one operand is equal to zero, and bit i in the other operand is equal to one, with carry-in equal to one:

$W(i) = A(i) \text{ V } B(i) = 1 \text{ with } C(i+1) = 1$

For:

$Sum(i) = A(i) \text{ V } B(i) \text{ V } C(i+1) = 0 \text{ with COUT} = 1$

Case 2. Bit i in both operands are equal to one, with carry-in equal to zero:

$G(i) = A(i)B(i) = 1 \text{ with } C(i+1) = 0$

For:

$Sum(i) = A(i) \text{ V } B(i) \text{ V } C(i+1) = 0 \text{ with COUT} = 1$ with G(i) produced for every needed i by the circuitry of FIG. 14.

Case 3. Bit i in both operands are equal to zero, with carry-in equal to zero:

$T(i) = A(i) | B(i) = 0 \text{ with } C(i+1) = 0$

For:

$Sum(i) = A(i) \text{ V } B(i) \text{ V } C(i+1) = 0 \text{ with COUT} = 0$

For a bit string of length N, only certain permutations of the three conditions listed above will permit a string of zeros as the result of an add operation.

When T(i) = 0 for some i, the add operations on the bit less significant than bit i cannot produce a carryout of 1 if the sum(i) is to be equal to zero. The only operation listed above that does not produce a carryout of 1 when the sum equals zero is T(i) = 0, where A(i) = B(i) = 0. In other words, if bit position i has zeros in both operand A and operand B, then bit position i+1 must have zeros for both operand A and operand B. In order for the resultant sum for bits i to N-1 to be equal to zero when T(i) = 0 for some i, the operands A and B for bit positions i to N-1 must also be zero or there will be a situation for some i that will violate Case 3. The carryin to the bit N-1 must also be a zero.

When W(i) = 1 for some i, the add operation on bit i+1 must produce a carryout of 1 for the sum to be equal to zero. The operations listed above that produce a carryout of 1 are Case 1 and Case 2. In other words, if bit position i has a 1 in only one operand, then bit positions i+1 must have either W(i+1) = 1 with C(i+2) = 1, or G(i+1) = 1 with C(i+2) = 0.

When G(i) = 1 for some i, the add operation on bit i+1 must produce a carryout of 0 for the sum(i) to be equal to zero. The only operation listed above that produces a carryout of 0 is where T(i) = 0. That is, if bit position i has a 1 in both operands, then bit position i+1 must have zeros for both operand A and operand B. This implies that for G(i) = 1, then T(i+1) = T(i+2) = ... = T(N) = 0.

Also, since both G(i) = 1 and W(i) = 1 must generate a carryout for the sum of bit i to equal zero, a G(i-1) = 1 or a T(i-1) = 0 may not follow either G(i) = 1 or W(i) = 1.

Logically combining the above operations with each other to equal 1 if the sum of the operands is equal to zero yields three possible sequences.

The sequences are:

1. $T(0)'T(1)' \ldots T(N-1)'$ with $C_{in} = 0$

Where:

T(i), for every needed i, is produced by the circuitry described in FIG. 13.

$T(0)'T(1)' \ldots T(N-1)'$ is a set of contiguous T' operations on each bit position of the operands, starting at bit 0 and ending on bit N-1. Both operands consist of all zeros in all bit positions for this sequence.

2. $W(0)W(1) \ldots W(i-1)G(i)T(i+1)'T(i+2)' \ldots T(N-1)'$ with $C_{in} = 0$

Where:

W(0)W(1) ... W(i-1) is a set of contiguous W operations on each bit position of the operands, starting at bit 0 and ending on bit i-1.

$T(i+1)'T(i+2)' \ldots T(N-1)'$ is a set of contiguous T' operations on each bit position of the operands, starting at bit i+1 and ending on bit N-1. Generally, in this sequence both operands consist of all zeroes in bit positions (N-1) through (i+1) and a one in bit position i. Each operand in bit positions (i-1) through 0 is the one's complement of the other in the same bit positions.

2(a). For special case of sequence 2 where
$G(i) = G(N-1) \quad W(0)W(1) \ldots W(N-2)G(N-1)$
with $C_{in} = 0$ Where:
  W(0)W(1) ... W(N−1) is a set of contiguous W operations on each bit position of the operands, starting at bit 0 and ending on bit N−2.

2(b). For special case of sequence 2 where G(i)=G(0) G(0)T(1)'T(2)' ... T(N−2)'T(N−1)' with $C_{in}=0$ Where:
  T(1)'T(2)' ... T(N−2)'T(N−1)' is a set of contiguous T' operations on each bit position of the operands, starting at bit 1 and ending on bit N−1.

3. W(0)W(1) ... W(N−1) with $C_{in}=1$

Where:
  W(0)W(1) ... W(N−1) is a set of contiguous W operations on each bit position of the operands, starting at bit 0 and ending on bit i−1. In this case, each operand is the one's complement of the other.

Let:
$$Z(0,1) = W(0)W(1) = (A(0)VB(0))(A(1)VB(1))$$
$$Z(0,2) = W(0)W(1)W(2) = (A(0)VB(0))(A(1)VB(1))(A(2)VB(2))$$
.
.
.
$$Z(0,N-1) = W(0)W(1) ... W(N-2)W(N-1)$$

Z(0, i), the group half-sum for every needed i, is produced by the gate logic circuitry illustrated in FIG. 15.

And:
$$M(0,1) = T(0)'T(1)'$$
$$M(0,2) = T(0)'T(1)'T(2)'$$
.
.
.
$$M(0,N-1) = T(0)'T(1)' ... T(N-2)'T(N-1)'$$

M(0), i, the group transmit for every needed i, is produced by the gate logic circuitry illustrated in FIG. 13. Let $C_{in}$ represent the carry into the least significant bit. Then for operands of bit length N, the "RESULT=0" function (F) may be written as:

$$F = M(0,N-1)C_{in}' +$$
$$G(0)M(1,N-1)C_{in}' +$$
$$W(0)G(1)M(2,N-1)C_{in}' +$$
$$Z(0,1)G(2)M(3,N-1)C_{in}' +$$
$$Z(0,2)G(3)M(4,N-1)C_{in}' +$$
.
.
.
$$Z(0,N-2)G(N-1)C_{in}' +$$
$$Z(0,N-1)C_{in}$$

(1)

where F is produced by the circuitry described in FIG. 17.

An implementation comprising all Boolean equations follows.

Level 0
A(i),B(i),A(i)',B(i)',$C_{in}$
Level 1
G(i)
W(i),T(i)',$NC_{in}$=$(C_{in})'$   (two each)

Level 2
ZA(00,07)=W(0)W(1)W(2)W(3)W(4)W(5)W(6)W(7)
ZB(00,07)=W(0)W(1)W(2)W(3)W(4)W(5)W(6)W(7)
ZC(00,07)=W(0)W(1)W(2)W(3)W(4)W(5)W(6)W(7)
ZA(08,15)=W(8)W(9)W(10)W(11)W(12)W(13)W(14)W(15)
ZB(08,15)=W(8)W(9)W(10)W(11)W(12)W(13)W(14)W(15)
ZA(16,23)=W(16)W(17)W(18)W(19)W(20)W(21)W(22)W(23)$NC_{in}$
MA(08,15)=T(8)'T(9)'T(10)'T(11)'T(12)'T(13)'T(14)'T(15)'
MA(16,23)=T(16)'T(17)'T(18)'T(19)'T(20)'T(21)'T(22)'T(23)'
MB(16,23)=T(16)'T(17)'T(18)'T(19)'T(20)'T(21)'T(22)'T(23)'
MA(24,31)=T(24)'T(25)'T(26)'T(27)'T(28)'T(29)'T(30)'T(31)'$NC_{in}$
MB(24,31)=T(24)'T(25)'T(26)'T(27)'T(28)'T(29)'T(30)'T(31)'$NC_{in}$
MC(24,31)=T(24)'T(25)'T(26)'T(27)'T(28)'T(29)'T(30)'T(31)'$NC_{in}$
Z(00,03)=W(0)W(1)W(2)W(3),
Z(04,07)=W(4)W(5)W(6)W(7),
Z(08,11)=W(8)W(9)W(10)W(11),
Z(12,15)=W(12)W(13)W(14)W(15)
Z(16,19)=W(16)W(17)W(18)W(19),
Z(20,23)=W(20)W(21)W(22)W(23)
Z(24,27)=W(24)W(25)W(26)W(27)$NC_{in}$,
M(04,07)=T(4)'T(5)'T(6)'T(7)'
M(08,11)=T(8)'T(9)'T(10)'T(11)',
M(12,15)=T(12)'T(13)'T(14)'T(15)'
M(16,19)=T(16)'T(17)'T(18)'T(19)',
M(20,23)=T(20)'T(21)'T(22)'T(23)'
M(24,27)=T(24)'T(25)'T(26)'T(27)',
M(28,31)=T(28)'T(29)'T(30)'T(31)'
WA(i)=W(i),MA(i)=T(i)' (power up)
Z(28,31)=W(28)W(29)W(30)W(31)

Level 3
Z0A=ZA(00,07)
Z0B=ZA(00,07)
Z0C=ZA(00,07)
Z01A=ZB(00,07)ZA(08,15)
Z01B=ZB(00,07)ZA(08,15)
Z01C=ZB(00,07)ZA(08,15)
Z012A=ZC(00,07)ZB(08,15)ZA(16,23)
Z012B=ZC(00,07)ZB(08,15)ZA(16,23)
Z012C=ZC(00,07)ZB(08,15)ZA(16,23)
M123A=MA(08,15)MA(16,23)MA(24,31)
M123B=MA(08,15)MA(16,23)MA(24,31)
M123C=MA(08,15)MA(16,23)MA(24,31)
M23A=MB(16,23)MB(24,31)
M23B=MB(16,23)MB(24,31)
M23C=MB(16,23)MB(24,31)
M3A=MC(24,31)
M3B=MC(24,31)
M3C=MC(24,31)
M013C=MC(00,07)MB(08,15)MB(24,31)
ZA(00,03)=Z(00,03), ZA(04,07)=Z(04,07) (power up)
ZA(08,11)=Z(08,11), ZA(12,15)=Z(12,15) (power up)
ZA(16,19)=Z(16,19), ZA(20,23)=Z(20,23) (power up)
ZA(24,27)=Z(24,27), MA(04,07)=M(04,07) (power up)
MA(08,11)=M(08,11), MA(12,15)=M(12,15) (power up)
MA(16,19)=M(16,19), MA(20,23)=M(20,23) (power up)
MA(24,27)=M(24,27), MA(28,31)=M(28,31) (power up)
Level 4
FZEROS=(M(00,07)M(08,15)M123A(1))
F00=(G(0)MA(1)MA(2)MA(3)MA(04,07)M123A(1))
F01=(WA(0)G(1)MA(2)MA(3)MA(04,07)M123A(1))
F02=(WA(0)WA(1)G(2)MA(3)MA(04,07)M123B(1))
F03=(WA(0)WA(1)WA(2)G(3)MA(04,07)M123B(1))
F04=(Z(00,03)G(4)MA(5)MA(6)MA(7)M123B(1))
F05=(ZA(00,03)WA(4)G(5)MA(6)MA(7)M123C(1))
F06=(ZA(00,03)WA(4)WA(5)G(6)MA(7)M123(1))
F07=(ZA(00,03)WA(4)WA(5)WA(6)G(7)M123C(1))
F08=(Z0A(1)G(8)MA(9)MA(10)MA(11)M(12,15)M23A(1))
F09=(Z0A(1)WA(8)G(9)MA(10)MA(11)MA(12,15)M23A(1))
F10=(Z0A(1)WA(8)WA(9)G(10)MA(11)MA(12,15)M23A(1))
F11=(Z0B(1)WA(8)WA(9)WA(10)G(11)MA(12,15)M23B(1))
F12=(Z0B(1)Z(08,11)G(12)MA(13)MA(14)MA(15)M23B(1))
F13=(Z0B(1)ZA(08,11)WA(12)G(13)MA(14)MA(15)M23B(1))
F14=(Z0C(1)ZA(08,11)WA(12)WA(13)G(14)MA(15)M23C(1))
F15=(Z0C(1)ZA(08,11)WA(12)WA(13)WA(14)G(15)M23C(1))
F16=(Z01A(1)G(16)MA(17)MA(18)MA(19)MA(20,23)M3A(1))
F17=(Z01A(1)WA(16)G(17)MA(18)MA(19)MA(20,23)M23A(1))
F18=(Z01A(1)WA(16)WA(17)G(18)MA(19)MA(20,23)M23A(1))
F19=(Z01B(1)WA(16)WA(17)WA(18)G(19)MA(20,23)M3B(1))

-continued

```
F20=(Z01B(1)Z(16,19)G(20)MA(21)MA(22)MA(23)M3B(1))
F21=(Z01B(1)ZA(16,19)WA(2)G(21)MA(22)MA(23)M3B(1))
F22=(Z01C(1)ZA(16,19)WA(20)WA(21)G(22)MA(23)M3C(1))
F23=(Z01C(1)ZA(16,19)WA(20)WA(21)WA(22)G(23)M3C(1))
F24=(Z012A(1)G(24)MA(25)MA(26)MA(27)M(28,31))
F25=(Z012A(1)WA(24)G(25)MA(26)MA(27)MA(28,31))
F26=(Z012A(1)WA(24)WA(25)G(26)MA(27)MA(28,31))
F27=(Z012B(1)WA(24)WA(25)WA(26)G(27)MA(28,31))
F28=(Z012B(1)Z(24,27)G(28)MA(29)MA(30)MA(31))
F29=(Z012B(1)ZA(24,27)WA(28)G(29)MA(30)MA(31))
F30=(Z012C(1)ZA(24,27)WA(28)WA(29)G(30)MA(31))
F31=(Z012C(1)ZA(24,27)WA(28)WA(29)WA(30)G(31))
FONES=(Z01C(1)Z(16,19)Z(20,23)Z(24,27)Z(28,31)C_{in})
```

Level 5

```
A0 = F00(1)|F01(1)|F02(1)|F03(1)|F04(1)
A1 = F05(1)|F06(1)|F07(1)|F08(1)|F09(1)
A2 = F10(1)|F11(1)|F12(1)|F13(1)|F14(1)
A3 = F15(1)|F16(1)|F17(1)|F18(1)|F19(1)
A4 = F20(1)|F21(1)|F22(1)|F23(1)|F24(1)
A5 = F25(1)|F26(1)|F27(1)|F28(1)|F29(1)
A6 = F30(1)|F31(1)|FZEROS(1)|ONES(1)
```

Level 6

```
F = (A0(1)|A1(1)|A2(1)|A3(1)|A4(1)|A5(1)|A6(1))
```

APPENDIX D

Let $A(i)$ be bit position $i$ in bit string A.
Let $B(i)$ be bit position $i$ in bit string B.
Let $L(i)$ and $D(i)$ be the bit comparison functions for bit position $i$. That is:

$L(i) = A(i)'B(i)$ for less than
$D(i) = A(i)B(i)'$ for greater than

For an N bit string, the string comparison functions may be written as follows:

$$
\begin{aligned}
LT = \ &L(0) \\
&| (G(0)|T(0)')L(1) \\
&| (G(0)|T(0)')(G(1)|T(1)')L(2) \\
&| (G(0)|T(0)')(G(1)|T(1)')(G(2)|T(2)')L(3) \\
&| \ \cdot \\
&| (G(0)|T(0)')(G(1)|T(1)') \ldots \\
&\quad (G(N-2)|T(N-2)')L(N-1)
\end{aligned}
$$

where LT is described in FIG. 18.

Figure 19:
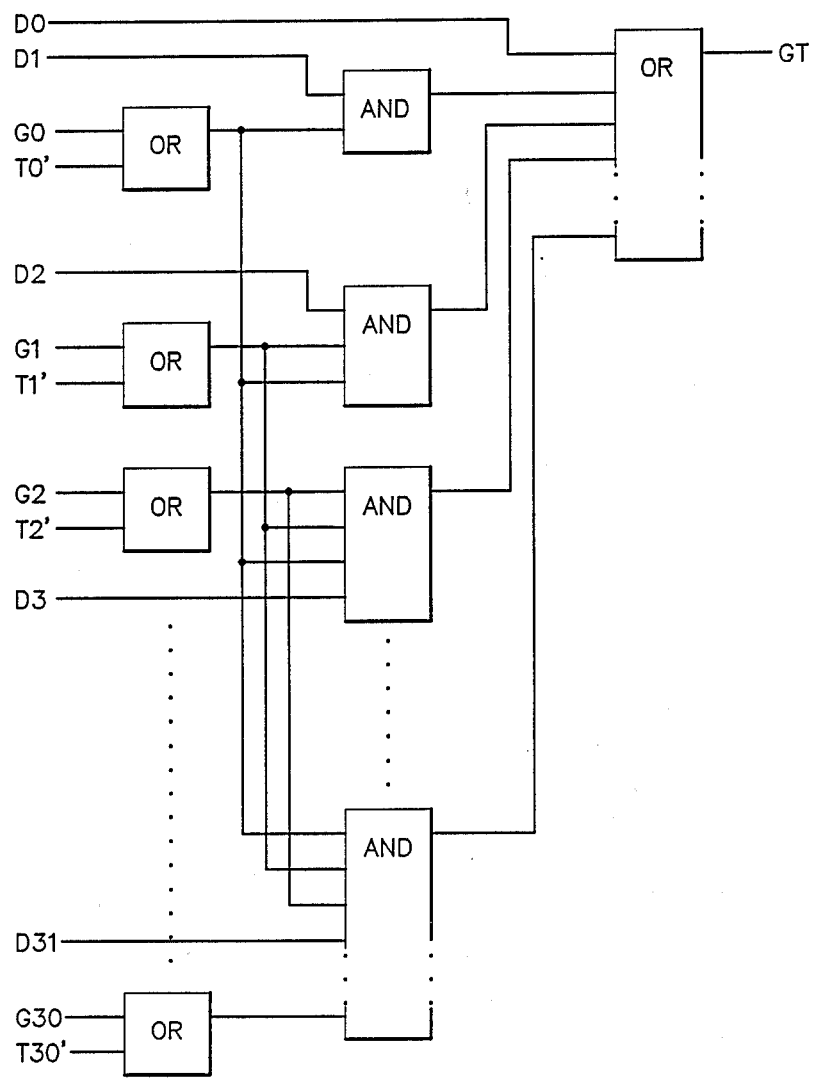

And:

$$
\begin{aligned}
GT = \ &D(0) \\
&| (G(0)|T(0)')D(1) \\
&| (G(0)|T(0)')(G(1)|T(1)')D(2) \\
&| (G(0)|T(0)')(G(1)|T(1)')(G(2)|T(2)')D(3) \\
&| \ \cdot \\
&| (G(0)|T(0)')(G(1)|T(1)') \ldots \\
&\quad (G(N-2)|T(N-2)')D(N-1)
\end{aligned}
$$

where GT is described in FIG. 19.

We claim:

1. In a computing system including an arithmetic operation unit responsive to a carry-in signal for performing an arithmetic operation on a pair of operands, A and B, each of said operands comprising an ordered sequence of N bits, $A(i)$ and $B(i)$, respectively, where $i = 0 \ldots N-1$, and, for each operand, the significance of operand bit $i$ being greater than the significance of any operand bit $i+M$, where $M = 1 \ldots N-1-i$, and for producing a digital output signal representing a result of said arithmetic operation, an improvement to said computing system for predicting when said result has a zero magnitude, said improvement comprising:

a carry-save adder circuit responsive to said operands for producing an ordered sequence of intermediate result signals by carry-free combination of operand A with operand B; and condition code prediction means connected to said carry-save adder circuit for generating a condition code signal based upon an algebraic combination of said carry-in signal with said ordered sequence of intermediate result signals and for providing an indication whether the magnitude of said result equals zero, said indication being provided substantially simultaneously with said result.

2. The improvement of claim 1, wherein said carry-save adder circuit produces intermediate result signals Pxi and Pyi, such that:

$Pxi = (A(i) \lor B(i))'$, and
$Pyi = (A(i) | B(i))$, where
$'$ is the logical complement,
$\lor$ is the exclusive-OR operation, and
$|$ is the OR operation.

3. The improvement of claim 2, wherein said carry-in signal is a digital signal having a value of "1" or "0", and said condition code prediction means receives said intermediate result signals and said carry-in signal to produce said condition code signal ("RESULT=0") according to:

"RESULT=0" = $(Px(N-1) \cdot D)$, for carry-in=0, and
"RESULT=0" = $(Px(N-1)' \cdot D)$, for carry-in=1, where $D = [(Px(0) \lor Py(1)) \cdot (Px(1) \lor Py(2)) \cdot \ldots \cdot (Px(N-2) \lor Py(N-1))]$, where "$\cdot$" is the AND operation.

4. The improvement of claim 1, wherein said condition code prediction means includes means responsive to said condition code signal for producing a second condition code signal indicating a sign of said result.

5. The improvement of claim 1 wherein said carry-save adder circuit produces intermediate result signals Pxi and Pyi, such that:

$Pxi = (A(i) \lor B(i)')'$, and
$Pyi = (A(i) | B(i)')$, where
$'$ is the logical complement
$\lor$ is the exclusive-OR operation, and
$|$ is the OR operation.

6. The improvement of claim 5, wherein said carry-in signal is a digital signal having a value of "1" or "0", and said condition code prediction means receives said intermediate result signals and said carry-in signal to produce said condition code signal ("RESULT=0") according to:

"RESULT=0" = $(Px(N-1) \cdot D)$ for carry-in=0, and
"RESULT=0"' = $(Px(N-1) \cdot D)$, for carry-in=1, where $D = [(Px(0) \lor Py(1)) \cdot (Px(1) \lor Py(2)) \cdot \ldots \cdot (Px(N-2) \lor Py(N-1))]$, where
"$\cdot$" is the AND operation 7. In a system including an arithmetic unit for selectively performing a plurality of arithmetic operations on a pair of operands A and B to produce a result R in response to a binary carry-in signal $C_{in}$, said carry-in signal having a first state, "0", indicating a first class of arithmetic operations in which no carry-in to the arithmetic unit occurs and a second state, "1", indicating a second class of arithmetic operations in which a carry-in to the arithmetic unit occurs, each of said operands including an ordered sequence of N bits, A(i) and B(i), respectively, where i=0...N−1, a method for generating a predictive condition code signal "RESULT=0" reflecting whether a result produced by said arithmetic unit will be zero, said method being executed in an apparatus including a modified adder connected to a condition code prediction circuit, and including the steps of:

algebraically combining said operands in said modified adder to produce a first sequence of intermediate term signals
Px=Px(0)...Px(i)...Px(N−1) and
Py=Py(0)...Py(i)...Py(N−1), wherein:
when $C_{in}$=0,
Px(i)=(A(i) V B(i))'
Py(i)=(A(i)|B(i); and
when $C_{in}$=1
Px(i)=(A(i) V B(i)')'
Py(i)=(A(i)|B(i)')
when $C_{in}$=0, algebraically combining said first sequence of intermediate term signals in said condition code prediction circuit with a "1" to produce a second sequence of intermediate term signals according to:

Px+Py+1=(Px(0+Py(1))||(Px(1)+Py(2))|| ...
||(Px(N−2)+Py(N−1))||(Px(N−1)+1); and generating said predictive condition code signal to reflect production of a zero result when each term of said second sequence has a magnitude of zero; and when $C_{in}$=1, algebraically combining said first sequence of intermediate term signals in said condition code prediction circuit with two "1"s to produce a third sequence of intermediate term signals according to:

Px+Py+1+1=(Px(0)+Py(1))|| ...
||(Px(N−2)+Py(N−1))||(Px(N−1)+1+1);
and generating said predictive condition code signal to reflect production of a non-zero result when each term of said third sequence has a magnitude of zero, where 1. | represents logical OR,
2. · represents logical AND,
3. V represents logical exclusive-OR,
4. + represents addition,
5. − represents subtraction,
6. A' is the one's complement of A, and
7. || represents concatenation.

8. The method of claim 7, wherein said steps of algebraically combining include the exclusive disjunction of Px and Py by said condition code prediction circuit according to:

D=[(Px(0) V Py(1))·(Px(1) V Py(2))·...·(Px(N−2) V Py(N−1))]; and wherein, when $C_{in}$=0, said predictive condition code signal is generated according to:
"RESULT=0"=Px(N−1)·D; and
when $C_{in}$=1, said predictive condition code signal is generated by said condition code prediction circuit according to:

"RESULT=0"=Px(N−1)'·D.

9. The method of claim 8, wherein said condition code prediction circuit includes means for generating indication signals J and K, such that J is true when $C_{in}$=0, and K is true when $C_{in}$=1, and selective means for combining D, Px(N−1), Px(N−1)' to produce said signal "RESULT=0", according to:

"RESULT=0"=D·[(J·Px(N−1))|(K·Px(N−1)')].

* * * * *

UNITED STATES PATENT AND TRADEMARK OFFICE
CERTIFICATE OF CORRECTION

PATENT NO. : 4,924,422
DATED : May 8, 1990
INVENTOR(S) : Vassiliadis et al

It is certified that error appears in the above-identified patent and that said Letters Patent is hereby corrected as shown below:

Col. 18, line 58, please delete " " " after the zero, and change "(N-1)" to --(N-1)'--.

Signed and Sealed this

Second Day of July, 1991

Attest:

HARRY F. MANBECK, JR.

*Attesting Officer*  *Commissioner of Patents and Trademarks*